US010425145B2

United States Patent
Kim et al.

(10) Patent No.: US 10,425,145 B2
(45) Date of Patent: Sep. 24, 2019

(54) DEVICE AND METHOD FOR TRANSMITTING/RECEIVING REFERENCE SIGNAL IN COMMUNICATION SYSTEM SUPPORTING FULL-DIMENSION MULTIPLE INPUT MULTIPLE OUTPUT MODE

(71) Applicant: Samsung Electronics Co., Ltd., Gyeonggi-do (KR)

(72) Inventors: Tae-Young Kim, Seongnam-si (KR); Ji-Yun Seol, Seongnam-si (KR); Keon-Kook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/524,229

(22) PCT Filed: Nov. 3, 2015

(86) PCT No.: PCT/KR2015/011681
§ 371 (c)(1),
(2) Date: Oct. 5, 2017

(87) PCT Pub. No.: WO2016/072689
PCT Pub. Date: May 12, 2016

(65) Prior Publication Data
US 2018/0062728 A1    Mar. 1, 2018

(30) Foreign Application Priority Data

Nov. 3, 2014  (KR) .......................... 10-2014-0151146

(51) Int. Cl.
*H04B 7/02*  (2018.01)
*H04B 7/10*  (2017.01)
(Continued)

(52) U.S. Cl.
CPC ............... *H04B 7/10* (2013.01); *H04B 7/022* (2013.01); *H04B 7/04* (2013.01); *H04B 7/0491* (2013.01);
(Continued)

(58) Field of Classification Search
CPC . H04B 7/10; H04B 7/022; H04B 7/04; H04B 7/0491; H04B 7/0632;
(Continued)

(56) References Cited

U.S. PATENT DOCUMENTS

2013/0308715 A1  11/2013  Nam et al.
2013/0329649 A1  12/2013  Wemersson et al.
(Continued)

FOREIGN PATENT DOCUMENTS

WO  2013100565 A1  7/2013
WO  2014126319 A1  8/2014

OTHER PUBLICATIONS

Asplund, H., et al., "Propagation Characteristics of Polarized Radio Waves in Cellular Communication," IEEE 66th Vehicular Technology Conference, Sep. 30-Oct. 3, 2007, pp. 839-843.
(Continued)

*Primary Examiner* — Zewdu A Kassa

(57) ABSTRACT

The present invention relates to a 5th-generation (5G) or pre-5G communication system to be provided for supporting a data transmission rate higher than that of a 4th-generation (4G) communication system, such as long term evolution (LTE), and subsequent systems. According to the present invention, a method of a transmitting apparatus includes transmitting, to a receiving apparatus, reference signals through m antenna ports; and transmitting, to the receiving apparatus, the reference signals through n antenna ports, wherein each of the m antenna ports has a first polarization characteristic, each of the n antenna ports has a second
(Continued)

polarization characteristic, the m antenna ports are included in a first axis of a two-dimensional space generated based on a vertical axis and a horizontal axis of a uniform planar array (UPA) antenna, and the n antenna ports are included in a second axis of the two-dimensional space.

16 Claims, 12 Drawing Sheets

(51) Int. Cl.
    *H04B 7/04*     (2017.01)
    *H04B 7/022*     (2017.01)
    *H04B 7/0491*     (2017.01)
    *H04B 7/06*     (2006.01)
    *H04L 25/02*     (2006.01)
    *H04L 5/00*     (2006.01)

(52) U.S. Cl.
    CPC ......... *H04B 7/0632* (2013.01); *H04B 7/0639* (2013.01); *H04L 25/0226* (2013.01); *H04L 5/0023* (2013.01); *H04L 5/0048* (2013.01)

(58) Field of Classification Search
    CPC . H04B 7/0639; H04L 25/0272; H04L 5/0048; H04L 25/0292; H04L 25/028; H04L 25/08; H04L 7/0008

USPC ................ 375/267, 260, 259, 316, 295, 219
    See application file for complete search history.

(56) References Cited

U.S. PATENT DOCUMENTS

| | | |
|---|---|---|
| 2014/0098689 A1 | 4/2014 | Lee et al. |
| 2014/0301492 A1 | 10/2014 | Xin et al. |
| 2015/0124736 A1* | 5/2015 | Ko ........................ H04B 7/0626 370/329 |
| 2017/0244462 A1* | 8/2017 | Wei ....................... H04B 7/0469 |
| 2017/0288758 A1* | 10/2017 | Kakishima ............... H04B 7/04 |

OTHER PUBLICATIONS

Kozono, S., et al., "Base Station Polarization Diversity Reception for Mobile Radio," IEEE Transactions on Vehicular Technology, vol. VT-33, No. 4, Nov. 1984, pp. 301-306.

Oestges, C., et al., "Dual-Polarized Wireless Communications: From Propagation Models to System Performance Evaluation," IEEE Transactions on Wireless Communications, vol. 7, No. 10, Oct. 2008, pp. 4019-4031.

Vaughan, R., et al., "Polarization Diversity in Mobile Communication," IEEE Transactions on Vehicular Technology, vol. 39, No. 3, Aug. 1990, pp. 177-186.

* cited by examiner

DEVICE AND METHOD FOR TRANSMITTING/RECEIVING REFERENCE SIGNAL IN COMMUNICATION SYSTEM SUPPORTING FULL-DIMENSION MULTIPLE INPUT MULTIPLE OUTPUT MODE

CROSS-REFERENCE TO RELATED APPLICATION(S) AND CLAIM OF PRIORITY

The present application claims priority under 35 U.S.C. § 365 to International Patent Application No. PCT/KR2015/011681 filed on Nov. 3, 2015, entitled "DEVICE AND METHOD FOR TRANSMITTING/RECEWING REFERENCE SIGNAL IN COMMUNICATION SYSTEM SUPPORTING FULL-DIMENSION MULTIPLE INPUT MULTIPLE OUTPUT MODE", and, to Korean Patent Application No. 10-2014-0151146 filed on Nov. 3, 2014, each of which are incorporated herein by reference into the present disclosure as if fully set forth herein.

TECHNICAL FIELD

The present disclosure relates to an apparatus and method for transmitting/receiving a reference signal in a communication system supporting a full-dimension multiple input multiple output (FD-MIMO) scheme, and more particularly, to an apparatus and method for transmitting/receiving a reference signal by considering a cross-polarization antenna characteristic in a communication system supporting an FD-MIMO scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

A communication system has been developed to support a higher data rate for satisfying a continuously increased wireless data traffic demand. For example, a communication system has been developed to enhance spectral efficiency and increase channel capacity based on various schemes such as an orthogonal frequency division multiplexing (OFDM) scheme, a multiple input multiple output (MIMO) scheme, and/or the like for increasing a data rate.

Specially, the MIMO scheme is a scheme in which a signal transmitting apparatus, e.g., a base station increases system capacity using a plurality of antennas. In the early days of the MIMO scheme, a study for a scheme of increasing capacity by increasing the number of antennas used in each of a signal transmitting apparatus and a signal receiving apparatus, e.g., a station has been mainly progressed.

However, considering actual implementation, the MIMO scheme has been developed to increase the number of antennas used in a signal transmitting apparatus, e.g., a base station which is relatively easy to actually implement in terms of a size and complexity than a signal receiving apparatus, e.g., a station which is relatively difficult for antenna expansion and complex computation due to a size and available power limitation.

In a 3rd generation partnership project (3GPP) Release 10 standard also referred to as long-term evolution-advanced (LTE-A), a transmitting scheme for a base station supporting up to 8 antennas has been developed. Recently, in the LTE-A, study for an FD-MIMO scheme in which a base station supports up to 64 antennas has been actively progressed.

Meanwhile, in a uniform linear array (ULA) antenna where a relatively large number of antennas are arranged only in a horizontal direction or the relatively large number antennas are arranged only in a vertical direction, a space which element antennas included in the ULA antenna occupy is very large, so it is practically impossible to implement the ULA antenna. For example, in a case that 64 element antennas are arranged at a $\lambda/2$ distance only in a horizontal direction or the 64 element antennas are arranged at the $\lambda/2$ distance only in a vertical direction, a total length which the 64 element antennas occupy is about 5 m. So, considering a base station space in communication systems which have been proposed up to now, it is impossible to practically implement the UPA antenna.

So, a uniform planar array (UPA) antennas with a structure different from this ULA antenna has been considered in the communication system supporting the FD-MIMO scheme. Here, the UPA antenna has a form in which a plurality of element antennas are arranged in a two-dimensional space considering all of a horizontal direction and a vertical direction. The UPA antenna enables to solve spatial limitation problem in a base station which has been proposed up to now and to practically implement an FD-MIMO scheme which is based on a plurality of antennas.

It is possible to support an FD-MIMO scheme which may use a relatively large number of antennas by using the UPA antenna, so a base station may support a larger number of antennas than before. So, the base station has been tried to equip a large number of antennas and to increase system capacity of a wireless communication system using these antennas.

For increasing system capacity, channel information between a signal transmitting apparatus, e.g., a base station and a signal receiving apparatus, e.g., a station is required. In a case of a communication system supporting a frequency division duplexing (FDD) scheme, a signal receiving apparatus estimates channel information using a reference signal (RS) received through a downlink signal and feeds back the estimated channel information to a signal transmitting apparatus through a uplink in order to provide channel information required in the signal transmitting apparatus.

Further, in a communication system supporting an LTE-Advanced scheme, a signal receiving apparatus estimates channel information using a channel state information-reference signal (CSI-RS) received through a downlink signal and feeds back the estimated channel information to a signal transmitting apparatus through a uplink in order to provide channel information required in the signal transmitting apparatus. For exact channel estimation, a CSI-RS is designed so that each antenna has an orthogonal characteristic, e.g., a time dimension, a frequency dimension, and a code dimension. Due to this orthogonal characteristic, if the number of antennas is increased, resources used for CSI-RS transmission are also increased.

This characteristic of a CSI-RS, i.e., a characteristic that resources used for CSI-RS transmission are increased according to increase of the number of antennas becomes more serious in a communication system supporting an FD-MIMO scheme which supports a relatively large number of antennas.

So, there is a need for a reference signal transmitting/receiving scheme in which it is possible for a signal receiving apparatus to exactly estimate channel information and to decrease the number of resources used for transmitting a reference signal in the communication system supporting the FD-MIMO scheme.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for transmitting/receiving a reference signal in a communication system supporting an FD-MIMO scheme.

An embodiment of the present disclosure proposes an apparatus and method for transmitting/receiving a reference signal in a communication system supporting an FD-MIMO scheme thereby exactly estimating channel information.

An embodiment of the present disclosure proposes an apparatus and method for transmitting/receiving a reference signal in a communication system supporting an FD-MIMO scheme thereby decreasing the number of resources used for reference signal transmission.

An embodiment of the present disclosure proposes an apparatus and method for transmitting/receiving a reference signal by considering a UPA antenna characteristic in a communication system supporting an FD-MIMO scheme.

An embodiment of the present disclosure proposes an apparatus and method for transmitting/receiving a reference signal by considering a cross-polarization antenna characteristic in a communication system supporting an FD-MIMO scheme.

In accordance with an aspect of the present disclosure, a method for transmitting a reference signal in a transmitting apparatus in a communication system supporting a full-dimension multiple input multiple output (FD-MIMO) scheme is provided. The method includes transmitting reference signals to a receiving apparatus through m antenna ports; and transmitting the reference signals to the receiving apparatus through n antenna ports, wherein the m antenna ports have a first polarization characteristic, wherein the n antenna ports have a second polarization characteristic, wherein the m antenna ports are included in a first axis of a two-dimensional space generated based on a vertical axis and a horizontal axis of a uniform planar array (UPA) antenna, and wherein the n antenna ports are included in a second axis of the two-dimensional space.

In accordance with another aspect of the present disclosure, a method for receiving a reference signal in a receiving apparatus in a communication system supporting a full-dimension multiple input multiple output (FD-MIMO) scheme is provided. The method includes receiving reference signals from a transmitting apparatus, wherein the reference signals include reference signals which are transmitted in the transmitting apparatus through m antenna ports and reference signals which are transmitted in the transmitting apparatus through n antenna ports, wherein the m antenna ports have a first polarization characteristic, wherein the n antenna ports have a second polarization characteristic, wherein the m antenna ports are included in a first axis of a two-dimensional space generated based on a vertical axis and a horizontal axis of a uniform planar array (UPA) antenna, and wherein the n antenna ports are included in a second axis of the two-dimensional space.

In accordance with still another aspect of the present disclosure, a transmitting apparatus in a communication system supporting a full-dimension multiple input multiple output (FD-MIMO) scheme is provided. The transmitting apparatus includes a transmitter configured to transmit reference signals to a receiving apparatus through m antenna ports, and to transmit the reference signals to the receiving apparatus through n antenna ports, wherein the m antenna ports have a first polarization characteristic, wherein the n antenna ports have a second polarization characteristic, wherein the m antenna ports are included in a first axis of a two-dimensional space generated based on a vertical axis and a horizontal axis of a uniform planar array (UPA) antenna, and wherein the n antenna ports are included in a second axis of the two-dimensional space.

In accordance with still another aspect of the present disclosure, a receiving apparatus in a communication system supporting a full-dimension multiple input multiple output (FD-MIMO) scheme is provided. The receiving apparatus includes a receiver configured to receive reference signals from a transmitting apparatus, wherein the reference signals include reference signals which are transmitted in the transmitting apparatus through m antenna ports and reference signals which are transmitted in the transmitting apparatus through n antenna ports, wherein the m antenna ports have a first polarization characteristic, wherein the n antenna ports have a second polarization characteristic, wherein the m antenna ports are included in a first axis of a two-dimensional space generated based on a vertical axis and a horizontal axis of a uniform planar array (UPA) antenna, and wherein the n antenna ports are included in a second axis of the two-dimensional space.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
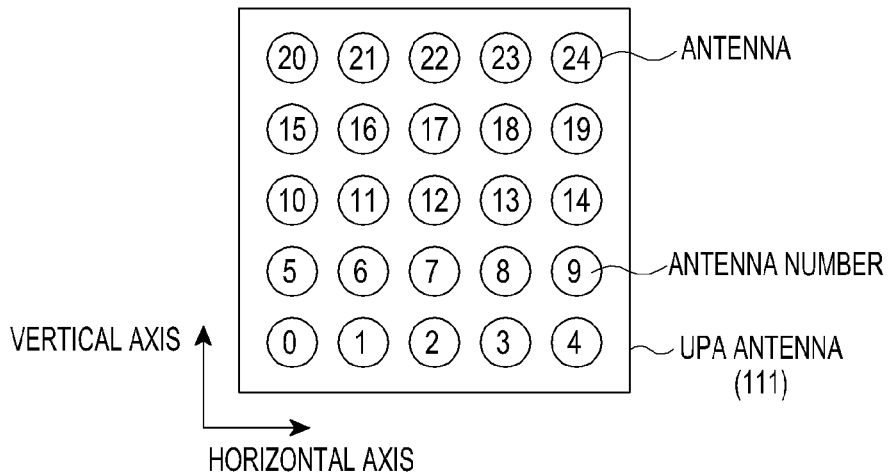
FIG. 1 schematically illustrates a structure of a UPA antenna used in an FD-MIMO communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HIVID), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a station (STA) may be an electronic device.

According to various embodiments of the present disclosure, a station operates as, for example, a receiving apparatus for receiving a reference signal (RS), and a base station operates as, for example, a transmitting apparatus for transmitting a reference signal.

An embodiment of the present disclosure proposes an apparatus and method for transmitting/receiving a reference signal in a communication system supporting a full-dimension multiple input multiple output (FD-MIMO) scheme.

An embodiment of the present disclosure proposes an apparatus and method for transmitting/receiving a reference signal in a communication system supporting an FD-MIMO scheme thereby exactly estimating channel information.

An embodiment of the present disclosure proposes an apparatus and method for transmitting/receiving a reference signal in a communication system supporting an FD-MIMO scheme thereby decreasing the number of resources used for reference signal transmission.

An embodiment of the present disclosure proposes an apparatus and method for transmitting/receiving a reference signal by considering a uniform planar array (UPA) antenna characteristic in a communication system supporting an FD-MIMO scheme.

An embodiment of the present disclosure proposes an apparatus and method for transmitting/receiving a reference signal by considering a cross-polarization antenna characteristic in a communication system supporting an FD-MIMO scheme.

A method and apparatus proposed in an embodiment of the present disclosure may be applied to various communication systems such as an institute of electrical and electronics engineers (IEEE) 802.11 communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

Hereinafter, for convenience, a communication system supporting an FD-MIMO scheme will be referred to as 'FD-MIMO communication system'.

A structure of a UPA antenna used in an FD-MIMO communication system according to an embodiment of the present disclosure will be described with reference to FIG. 1.

FIG. 1 schematically illustrates a structure of a UPA antenna used in an FD-MIMO communication system according to an embodiment of the present disclosure.

Prior to a description of FIG. 1, in the FD-MIMO communication system, a UPA antenna with a form in which a plurality of element antennas are arrayed in a two-dimensional space which considers a horizontal direction and a vertical direction has been considered.

Specially, the UPA antenna may include a larger number of element antennas in a relatively small space compared to a uniform linear array (ULA) antenna in which a relatively large number of element antennas are arranged only in a horizontal direction or the relatively large number of element antennas are arranged only in a vertical direction, so the FD-MIMO communication system actively has considered support for the UPA antenna.

Referring back to FIG. 1, a shown UPA antenna 111 includes total 25 element antennas, i.e., an element antenna #0 to an element antenna #24. The UPA antenna 111 with a structure in which 5 element antennas are included in a horizontal axis and 5 element antennas are included in a vertical axis.

That is, the UPA antenna 111 includes, in a horizontal axis, total 5 rows including the first row including an element antenna #0 to an element antenna #4, the second row including an element antenna #5 to an element antenna #9, the third row including an element antenna #10 to an element antenna #14, the fourth row including an element antenna #15 to an element antenna #19, and the fifth row including an element antenna #20 to an element antenna #24.

Further, the UPA antenna 111 includes, in a vertical axis, total 5 columns including the first column including an element antenna #0, an element antenna #5, an element antenna #10, an element antenna #15, and an element antenna #20, the second column including an element antenna #1, an element antenna #6, an element antenna #11, an element antenna #16, and an element antenna #21, the third column including an element antenna #2, an element antenna #7, an element antenna #12, an element antenna #17, and an element antenna #22, the fourth column including an element antenna #3, an element antenna #8, an element antenna #13, an element antenna #18, and an element antenna #23, and the fifth column including an element antenna #4, an element antenna #9, an element antenna #14, an element antenna #19, and an element antenna #24.

Meanwhile, channel information between a signal transmitting apparatus, e.g., a base station and a signal receiving apparatus, e.g., a station is required for increasing system capability. In a case of a communication system supporting a frequency division duplexing (FDD) scheme, for providing channel information required in a signal transmitting apparatus, a signal receiving apparatus estimates channel information using a reference signal received through a downlink signal and feeds back the estimated channel information to the signal transmitting apparatus through a uplink.

Further, in a communication system supporting an LTE-Advanced scheme, for providing channel information required in a signal transmitting apparatus, a signal receiving apparatus estimates channel information using a channel state information-reference signal (CSI-RS, hereinafter, will be referred to as 'CSI-RS') received through a downlink signal and feeds back the estimated channel information to the signal transmitting apparatus through a uplink. Here, for exact channel estimation, a CSI-RS is designed so that each antenna has an orthogonal characteristic, e.g., a time dimension, a frequency dimension, and a code dimension.

A scheme of estimating channel information using a CSI-RS and feeding back the estimated channel information may be implemented by allocating a resource for CSI-RS transmission to each of all element antennas, i.e., an element antenna #0 to an element antenna 24.

However, in a case of transmitting a CSI-RS using this scheme, an orthogonal characteristic among element antennas may be maintained, but the number of resources (time/frequency/code resources) used for CSI-RS transmission is increased according to increase of the number of element antennas. This characteristic of a CSI-RS, i.e., a characteristic that resources used for CSI-RS transmission are increased according to increase of the number of antennas may be more serious in a communication system supporting an FD-MIMO scheme which supports a relatively large number of antennas.

So, an embodiment of the present disclosure proposes a reference signal transmitting/receiving scheme in which it is possible for a signal receiving apparatus to exactly estimate channel information and to decrease resources used for reference signal transmission in the communication system supporting an FD-MIMO scheme, and this will be described below.

Firstly, a scheme of determining a beamforming factor for each element antenna included in a UPA antenna will be described below.

A signal transmitted per element antenna for one ray may be expressed as a combination of a signal transmitted in a horizontal axis and a signal transmitted in a vertical axis, and a signal received per element antenna for one ray may be expressed as a combination of a signal received in a horizontal axis and a signal received in a vertical axis. This characteristic has been confirmed already through mathematical modeling. Here, a scheme of combining the signals transmitted/received in the horizontal axis and the signals transmitted/received in the vertical axis is based on a Kronecker-product computation. So, signals transmitted on all element antennas included in a UPA antenna may be recovered based on the Kronecker-product computation.

Meanwhile, channels for all element antennas included in an UPA antenna may be estimated using a characteristic that signals transmitted on the all element antennas included in the UPA antenna may be recovered in an line of sight (LOS) environment, i.e., an environment where a signal is passed through a channel through one ray, so a signal receiving apparatus may exactly estimate channel information.

Here, CSI-RS antenna ports included in a UPA antenna used in an FD-MIMO communication system according to an embodiment of the present disclosure will be described with reference to FIG. 2.

Figure 2:
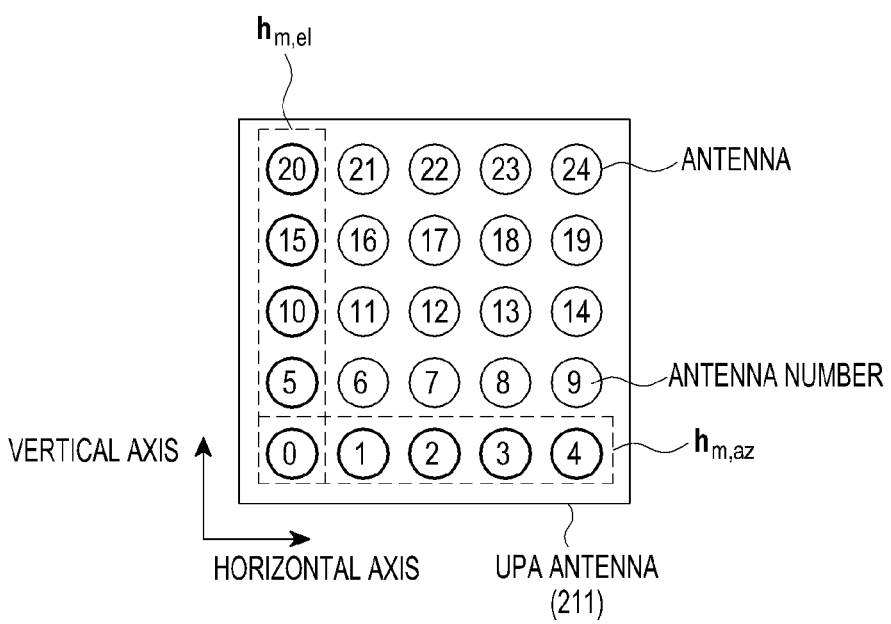
FIG. 2 schematically illustrates CSI-RS antenna ports included in a UPA antenna used in an FD-MIMO communication system according to an embodiment of the present disclosure.

FIG. 2 schematically illustrates CSI-RS antenna ports included in a UPA antenna used in an FD-MIMO communication system according to an embodiment of the present disclosure.

CSI-RS antenna ports shown in FIG. 2 denote CSI-RS antenna ports in a horizontal axis and a vertical axis which are possible when a channel is reconfigured based on a Kronecker-product computation in a case that it will be assumed that a signal transmitting apparatus use a UPA antenna 211 including total 25 element antennas, i.e., an element antenna #0 to an element antenna #24.

Firstly, CSI-RS antenna ports in a horizontal axis include an element antenna #0, an element antenna #1, an element antenna #2, an element antenna #3, and an element antenna #4 among the 25 element antennas. So, a channel vector $h_{m,az}$ may be estimated in an element antenna #m included in a UPA antenna (not shown in FIG. 2) used in a signal receiving apparatus. For convenience, the element antenna #m included in the UPA antenna used in the signal receiving apparatus will be referred to as 'reception element antenna #m'.

Next, CSI-RS antenna ports in a vertical axis include an element antenna #0, an element antenna #5, an element antenna #10, an element antenna #15, and an element antenna #20 among the 25 element antennas. So, a channel vector $h_{m,el}$ may be estimated in a reception antenna #m used in a signal receiving apparatus.

When a Kronecker-product computation ($\otimes$) and a vectorization computation (vec(.)) are performed on the channel vector $h_{m,az}$ and the channel vector $h_{m,el}$ estimated in the reception antenna #m as expressed in Equation (1), a channel, i.e., a channel $\hat{h}_m$, among the 25 element antennas included in the UPA antenna 211 and the reception antenna #m used by the signal receiving apparatus may be estimated.

$$\hat{h}_m = vec(h_{m,el} \otimes h_{m,az}) \qquad \text{Equation (1)}$$

In Equation (1), the channel $\hat{h}_m$ is a row vector, and a size of the row vector $\hat{h}_m$ is equal to $N_T$ (=25) as the number of the element antennas included in the UPA antenna 211.

In a case of assuming that the number of element antennas included in a UPA antenna used by the signal receiving apparatus is $N_R$, a channel $\hat{H}$ as a $N_R \times N_T$ MIMO channel formed between the signal transmitting apparatus and the signal receiving apparatus may be expressed as Equation (2).

$$\hat{H} = \begin{bmatrix} \hat{h}_0 \\ \hat{h}_1 \\ \vdots \\ \hat{h}_{N_R-1} \end{bmatrix} \qquad \text{Equation (2)}$$

In Equation (2), $\hat{h}_{N_R-1}$ denotes a channel between the signal transmitting apparatus and an element antenna #$N_R$−1 among element antennas included in the UPA antenna used by the signal receiving apparatus.

In a CSI-RS transmission scheme as described in FIG. 2, the number of element antennas used for transmitting a CSI-RS may be decreased compared to a CSI-RS transmission scheme as described in FIG. 1, so a resource used for transmitting a CSI-RS is not linearly increased proportional to the number of antennas used by a signal transmitting apparatus according to increase of the number of antennas.

So, a CSI-RS transmission scheme as described in FIG. 2 may decrease system capacity degradation of an FD-MIMO communication system compared to a CSI-RS transmission scheme as described in FIG. 1. However, even though the CSI-RS transmission scheme as described in FIG. 2 is used, accuracy of channel information estimated through partial element antennas and total channel information acquired through a Kronecker-product computation is operated as an important element which affects a performance of a CSI-RS transmission scheme.

In a communication system supporting an LTE-Advanced scheme, a cross-polarization antenna which may double the number of antennas without expanding a space which an antenna occupies is generally used. So, channels may be separately used using antennas which use different polarization characteristics without spatially separating antennas.

An example of CSI-RS antenna ports of a UPA antenna which uses a cross-polarization antenna as an element antenna used in an FD-MIMO communication system according to an embodiment of the present disclosure will be described with reference to FIG. 3.

Figure 3:
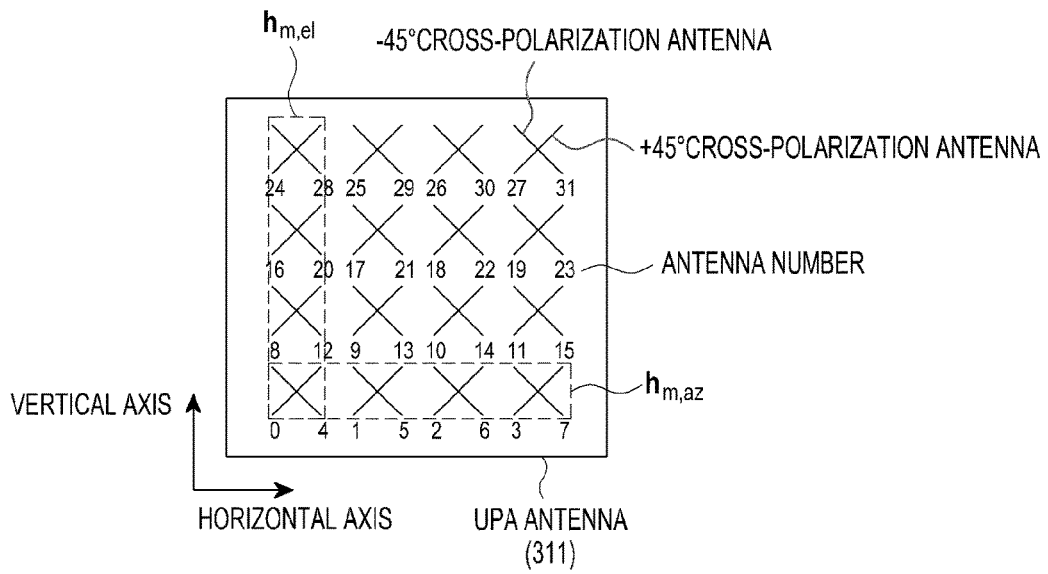
FIG. 3 schematically illustrates an example of CSI-RS antenna ports of a UPA antenna which uses a cross-polarization antenna as an element antenna used in an FD-MIMO communication system according to an embodiment of the present disclosure.

FIG. 3 schematically illustrates an example of CSI-RS antenna ports of a UPA antenna which uses a cross-polarization antenna as an element antenna used in an FD-MIMO communication system according to an embodiment of the present disclosure.

Referring to FIG. 3, a UPA antenna 311 uses a cross-polarization antenna as an element antenna, and the UPA antenna 311 includes total 32 cross-polarization antennas.

CSI-RS antenna ports shown in FIG. 3 indicate CSI-RS antenna ports in a horizontal axis and CSI-RS antenna ports in a vertical axis which are possible when a channel is reconfigured based on a Kronecker-product computation in a case of assuming that a signal transmitting apparatus uses a UPA antenna 311 including total 32 cross-polarization antennas, i.e., a cross-polarization antenna #0 to a cross-polarization antenna #31.

Meanwhile, in a case of a cross-polarization antenna, antennas which are located at the physically same location and have different polarization characteristics may be used as logically different CSI-RS antenna ports. So, a structure of a UPA antenna 311 as shown in FIG. 3 may be regarded the same as a structure of an antenna which logically consists of 8 horizontal CSI-RS antenna ports and 4 vertical CSI-RS antenna ports.

So, considering a CSI-RS transmission scheme as described in FIG. 2, 8 CSI-RS antenna ports in a horizontal axis include a cross-polarization antenna#0, a cross-polarization antenna#1, a cross-polarization antenna#2, a cross-polarization antenna#3, a cross-polarization antenna#4, a cross-polarization antenna#5, a cross-polarization antenna#6, and a cross-polarization antenna#7, and 4 CSI-RS antenna ports in a vertical axis include a cross-polarization antenna#0, a cross-polarization antenna#8, a cross-polarization antenna#16, and a cross-polarization antenna#24.

Firstly, it will be understood that cross-polarization antennas set as CSI-RS antenna ports in a horizontal axis are 4+45° cross-polarization antennas and 4-45° cross-polarization antennas as shown in FIG. 3.

Alternatively, it will be understood that all of cross-polarization antennas set as CSI-RS antenna ports in a vertical axis are +45° cross-polarization antennas as shown in FIG. 3.

An example of CSI-RS antenna ports of a UPA antenna which uses a cross-polarization antenna as an element antenna used in an FD-MIMO communication system according to an embodiment of the present disclosure has been described with reference to FIG. 3, and a characteristic of a MIMO channel matrix in a case that a cross-polarization antenna is used in an FD-MIMO communication system according to an embodiment of the present disclosure will be described with reference to FIG. 4.

Figure 4:
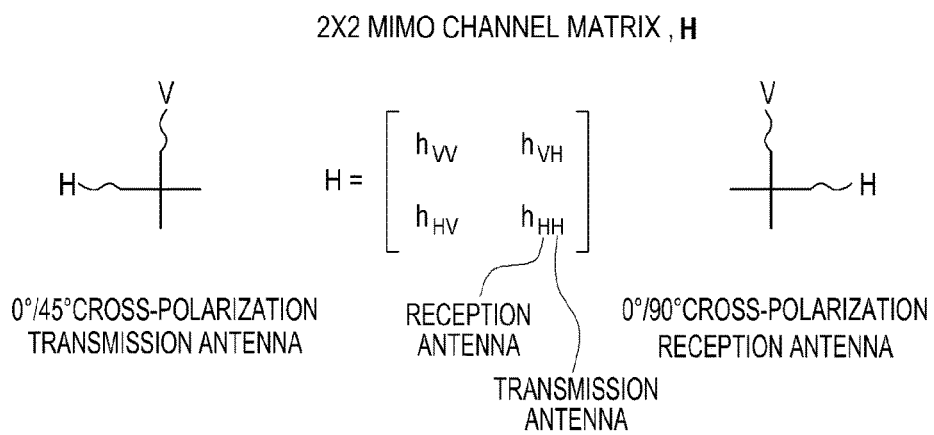
FIG. 4 schematically illustrates a characteristic of a MIMO channel matrix in a case that a cross-polarization antenna is used in an FD-MIMO communication system according to an embodiment of the present disclosure.

FIG. 4 schematically illustrates a characteristic of a MIMO channel matrix in a case that a cross-polarization antenna is used in an FD-MIMO communication system according to an embodiment of the present disclosure.

Referring to FIG. 4, a shown MIMO channel matrix indicates a MIMO channel matrix in a case that both of a signal transmitting apparatus and a signal receiving apparatus use a cross-polarization antenna. A MIMO channel matrix as shown in FIG. 4 indicates a MIMO channel matrix in a case that each of a signal transmitting apparatus and a signal receiving apparatus uses a 0° cross-polarization antenna and a 90° cross-polarization antenna. In FIG. 4, it will be assumed that channel signals transmitted through cross-polarization antennas which have different polarization characteristics have different channel characteristics even though locations thereof are the same.

A MIMO channel matrix as shown in FIG. 4 in a case that each of a signal transmitting apparatus and a signal receiving apparatus uses a 0° cross-polarization antenna and a 90° cross-polarization antenna may be expressed as Equation (3).

$$H = \begin{bmatrix} h_{VV} & h_{VH} \\ h_{HV} & h_{HH} \end{bmatrix} \qquad \text{Equation (3)}$$

In Equation (3), H denotes a channel matrix, and $h_{ij}$ denotes a matrix element included in the channel matrix H. Here, the $h_{ij}$ denotes a matrix element for a reception antenna #i and a transmission antenna #j.

A cross-polar correlation (XPC) scheme has been defined for proving an assumption that channel signals transmitted through cross-polarization antennas which have different polarization characteristics have different channel characteristics even though locations thereof are the same, and XPC values measured in various channel environments are disclosed in various references. Here, an XPC value detected according to the XPC scheme may be expressed as Equation (4).

$$\rho_t = <h_{VV}, h_{VH}> = <h_{HV}, h_{HH}>$$ Equation (4)

In Equation (4), $\rho_t$ denotes the XPC value.

Meanwhile, in a case that a reception antenna receives signals through cross-polarization antennas which have different polarization characteristics, or a transmission antenna transmits signals through cross-polarization antennas which have different polarization characteristics, the XPC may be an indicator for evaluating a degree of having different channel characteristics by measuring correlation channels among the cross-polarization antennas which have the different polarization characteristics and the reception antenna or the transmission antenna and using the cross-polarization antennas which have the different polarization characteristics.

Here, XPC values estimated in various channel environments will be described with reference to Table 1.

TABLE 1

| Channel Environment | Cross-polar Correlation (XPC) |
|---|---|
| Outdoor (UMa), Indoor | ≈0 |
| UMi/UMa NLOS | 0.3 |
| Macro/Micro | 0.1 |
| Suburban/Urban | ≈0 |

As shown in Table 1, if a channel environment is an Outdoor(UMa), Indoor channel environment, an XPC value indicates about 0 (zero), if a channel environment is UMi/UMa NLOS channel environment, an XPC value indicates 0.3, if a channel environment is a Macro/Micro channel environment, an XPC value indicates 0.1, and if a channel environment is a Suburban/Urban channel environment, an XPC value indicates about 0 (zero).

As shown in Table 1, it will be understood that an XPC value is very small less than or equal to 0.3 in various channel environments. So, in a case of cross-polarization antennas which have different polarization characteristics, it will be understood that channels for the cross-polarization antennas almost never have correlation.

As described in FIG. 3, if CSI-RS antenna ports include +45° cross-polarization antennas and −45° cross-polarization antennas, that is, if CSI-RS antenna ports in a horizontal axis include +45° cross-polarization antennas and −45° cross-polarization antennas and CSI-RS antenna ports in a vertical axis include +45° cross-polarization antennas, accuracy of total antenna channel information estimated through channel information which almost never has correlation and a Kronecker-product computation may be low.

So, an embodiment of the present disclosure proposes a scheme of transmitting/receiving a CSI-RS by considering a cross-polarization antenna characteristic in a case that a UPA antenna including cross-polarization antennas is used.

Firstly, in a case that CSI-RS antenna ports are allocated in a horizontal axis and a vertical axis without considering a cross-polarization antenna characteristic as described in FIG. 3, accuracy of total antenna channel information estimated through channel information which almost never has correlation and a Kronecker-product computation may be low.

So, an embodiment of the present disclosure proposes a scheme of transmitting/receiving a CSI-RS by additionally allocating CSI-RS antenna ports in a vertical axis as well as by allocating CSI-RS antenna ports in a horizontal axis and a vertical axis as described in FIG. 3 in order to acquire exact total antenna channel information.

A process of indexing an antenna number for a UPA antenna which uses a co-polarization antenna as an element antenna used in an FD-MIMO communication system according to an embodiment of the present disclosure will be described with reference to FIG. 5.

Figure 5:
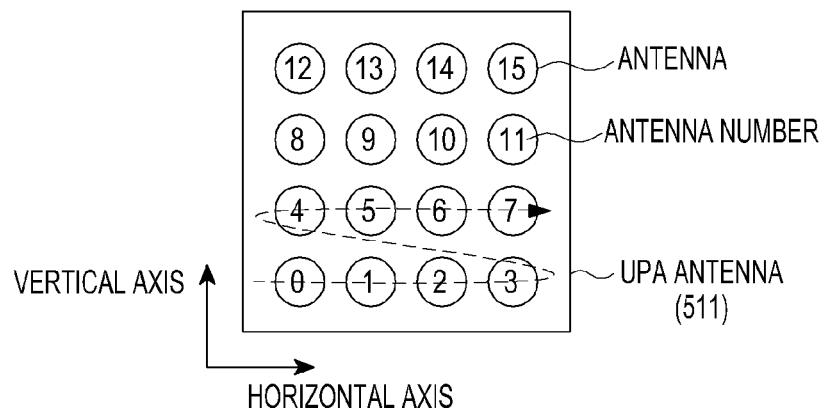
FIG. 5 schematically illustrates a process of indexing an antenna number for a UPA antenna which uses a co-polarization antenna as an element antenna used in an FD-MIMO communication system according to an embodiment of the present disclosure.

FIG. 5 schematically illustrates a process of indexing an antenna number for a UPA antenna which uses a co-polarization antenna as an element antenna used in an FD-MIMO communication system according to an embodiment of the present disclosure.

Referring to FIG. 5, a UPA antenna 511 uses a co-polarization antenna as an element antenna, and the UPA antenna 511 includes total 16 co-polarization antennas, i.e., a co-polarization antenna #0 to a co-polarization antenna #15.

An antenna number indexing process as shown in FIG. 5 indicates an antenna number indexing process for a UPA antenna 511 including total 16 co-polarization antennas including co-polarization antennas including 4 co-polarization antennas in a horizontal axis and 4 co-polarization antennas in a vertical axis. That is, an antenna number indexing process as shown in FIG. 5 is an antenna number indexing process in which an antenna number is firstly indexed so that an antenna number is increased on a horizontal axis basis, and then an antenna number is indexed so that an antenna number is increased on a vertical axis basis.

So, in a horizontal axis, the UPA antenna 511 includes the first row of a co-polarization antenna #0 to a co-polarization antenna #3, the second row of a co-polarization antenna #4 to a co-polarization antenna #7, the third row of a co-polarization antenna #8 to a co-polarization antenna #11, and the fourth row of a co-polarization antenna #12 and a co-polarization antenna #15. Further, in a vertical axis, the UPA antenna 511 includes the first column including a co-polarization antenna #0, a co-polarization antenna #4, a co-polarization antenna #8, and a co-polarization antenna #12, the second column including a co-polarization antenna #1, a co-polarization antenna #5, a co-polarization antenna #9, and a co-polarization antenna #13, the third column including a co-polarization antenna #2, a co-polarization antenna #6, a co-polarization antenna #10, and a co-polarization antenna #14, and the fourth column including a co-polarization antenna #3, a co-polarization antenna #7, a co-polarization antenna #11, and a co-polarization antenna #15.

In FIG. 5, an antenna number indexing process in which an antenna number is firstly indexed so that an antenna number is increased on a horizontal axis basis, and then an antenna number is indexed so that an antenna number is increased on a vertical axis basis has been described. Alternatively, an antenna number is firstly indexed so that an antenna number is increased on a vertical axis basis, and then an antenna number is indexed so that an antenna number is increased on a horizontal axis basis. Further, in FIG. 5, a process in which an antenna number is indexed on a horizontal axis basis and a vertical axis basis has been described, but a process of indexing an antenna number is not limited to the horizontal axis and the vertical axis.

An example of a process of indexing an antenna number for a UPA antenna which uses a co-polarization antenna as an element antenna used in an FD-MIMO communication system according to an embodiment of the present disclosure has been described with reference to FIG. 5, and a process of indexing an antenna number for a UPA antenna which uses a cross-polarization antenna as an element antenna used in an FD-MIMO communication system according to an embodiment of the present disclosure will be described with reference to FIG. 6.

Figure 6:
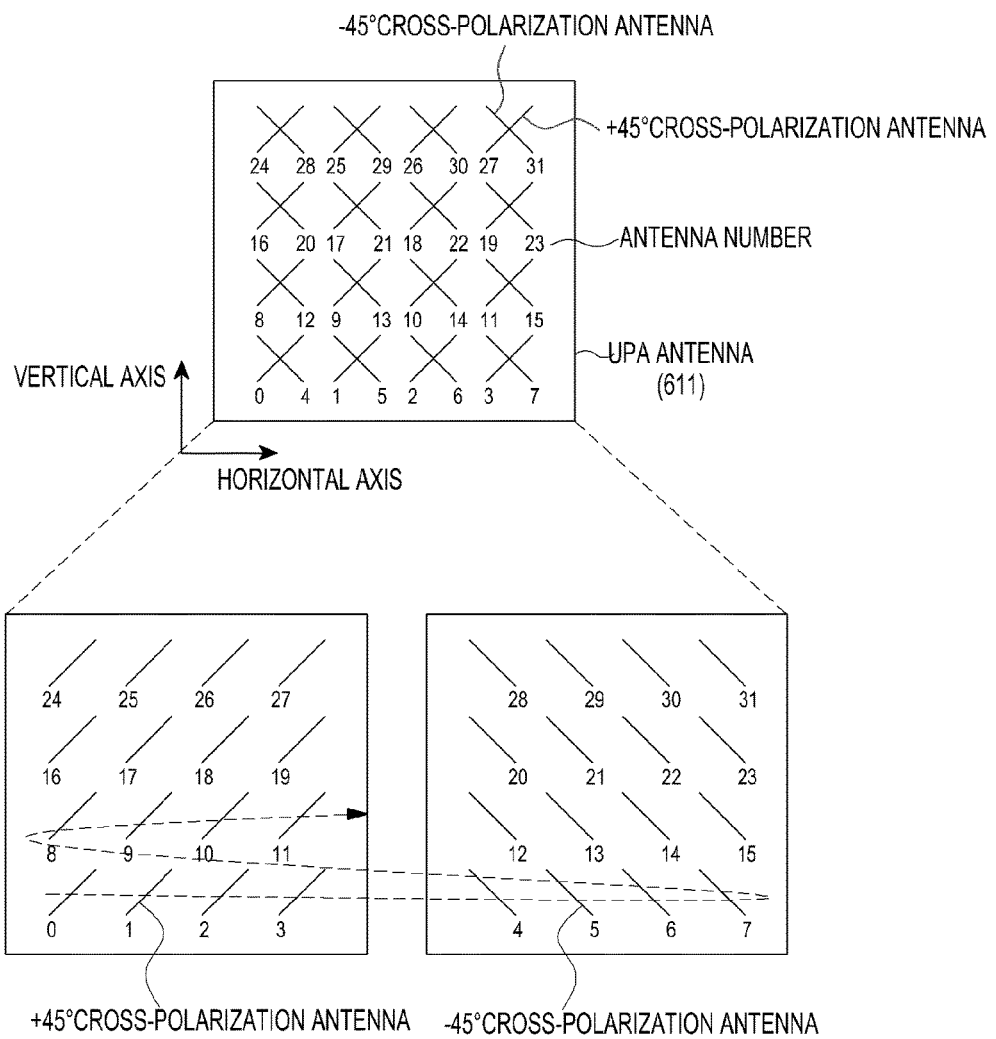
FIG. 6 schematically illustrates a process of indexing an antenna number for a UPA antenna which uses a cross-polarization antenna as an element antenna used in an FD-MIMO communication system according to an embodiment of the present disclosure.

FIG. 6 schematically illustrates a process of indexing an antenna number for a UPA antenna which uses a cross-polarization antenna as an element antenna used in an FD-MIMO communication system according to an embodiment of the present disclosure.

Referring to FIG. 6, a UPA antenna 611 uses a cross-polarization antenna as an element antenna, and the UPA antenna 611 includes total 32 cross-polarization antennas, i.e., a cross-polarization antenna #0 to a cross-polarization antenna #31.

An antenna number indexing process as shown in FIG. 6 indicates an antenna number indexing process for a UPA antenna 611 including total 32 cross-polarization antennas including 8 cross-polarization antennas in a horizontal axis and 4 polarization antennas in a vertical axis. That is, an antenna number indexing process as shown in FIG. 6 is an antenna number indexing process in which an antenna number is firstly indexed so that an antenna number is increased on a horizontal axis basis, and then an antenna number is indexed so that an antenna number is increased on a vertical axis basis. But, in FIG. 6, in a case that an antenna number is indexed in a horizontal axis, an antenna number is indexed so that a corresponding row includes cross-polarization antennas which have different polarization characteristics and a corresponding column includes cross-polarization antennas which have different polarization characteristics.

In FIG. 6, it will be assumed that the UPA antenna 611 includes, for example, cross-polarization antennas which have total two polarization characteristics such as a +45° polarization characteristic and a −45° polarization characteristic, and the number of cross-polarization antennas which have the +45° polarization characteristic is equal to the number of cross-polarization antennas which have the −45° polarization characteristic. In FIG. 6, cross-polarization antennas included in the UPA antenna 611 has been described with, for example, a +45° polarization characteristic and a −45° polarization characteristic, however, there is no limitation on a polarization characteristic of the cross-polarization antennas included in the UPA antenna 611.

So, in a horizontal axis, the UPA antenna 611 includes the first row including a cross-polarization antenna #0 to a cross-polarization antenna #7, the second row including a cross-polarization antenna #8 to a cross-polarization antenna #15, the third row including a cross-polarization antenna #16 to a cross-polarization antenna #23, and the fourth row including a cross-polarization antenna #24 to a cross-polarization antenna #31. Here, each of the cross-polarization antenna #0 to the cross-polarization antenna #4, the cross-polarization antenna #8 to the cross-polarization antenna #11, the cross-polarization antenna #16 to the cross-polarization antenna #19, and the cross-polarization antenna #24 to the cross-polarization antenna #27 is a +45° cross-polarization antenna, and each of the cross-polarization antenna #4 to the cross-polarization antenna #7, the cross-polarization antenna #12 to the cross-polarization antenna #15, the cross-polarization antenna #20 to the cross-polarization antenna #23, and the cross-polarization antenna #28 to the cross-polarization antenna #31 is a −45° cross-polarization antenna.

Further, in a vertical axis, the UPA antenna 611 includes the first column including a cross-polarization antenna #0, a cross-polarization antenna #8, a cross-polarization antenna #16, and a cross-polarization antenna #24, the second column including a cross-polarization antenna #1, a cross-polarization antenna #9, a cross-polarization antenna #17, and a cross-polarization antenna #25, the third column including a cross-polarization antenna #2, a cross-polarization antenna #10, a cross-polarization antenna #18, and a cross-polarization antenna #26, the fourth column including a cross-polarization antenna #3, a cross-polarization antenna #11, a cross-polarization antenna #19, and a cross-polarization antenna #27, the fifth column including a cross-polarization antenna #4, a cross-polarization antenna #12, a cross-polarization antenna #20, and a cross-polarization antenna #28, the sixth column including a cross-polarization antenna #5, a cross-polarization antenna #13, a cross-polarization antenna #21, and a cross-polarization antenna #29, the seventh column including a cross-polarization antenna #6, a cross-polarization antenna #14, a cross-polarization antenna #22, and a cross-polarization antenna #30, and the eighth column including a cross-polarization antenna #7, a cross-polarization antenna #15, a cross-polarization antenna #23, and a cross-polarization antenna #31.

In FIG. 6, an antenna number indexing process in which an antenna number is firstly indexed so that an antenna number is increased on a horizontal axis basis, and then an antenna number is indexed so that an antenna number is increased on a vertical axis basis has been described. Alternatively, an antenna number is firstly indexed so that an antenna number is increased on a vertical axis basis, and then an antenna number is indexed so that an antenna number is increased on a horizontal axis basis. Further, in FIG. 6, a process in which an antenna number is indexed on a horizontal axis basis and a vertical axis basis has been described, but a process of indexing an antenna number is not limited to the horizontal axis and the vertical axis.

As shown in FIG. 6, cross-polarization antennas may be regarded as different cross-polarization antennas in a case that polarization characteristics of the cross-polarization antennas are different even though the cross-polarization antennas are physically located at the same location. So, a UPA antenna 611 in which two cross-polarization antennas of which polarization characteristics are different are overlapped at the physically same location is shown in FIG. 6.

A process of indexing an antenna number for a UPA antenna which uses a cross-polarization antenna as an element antenna used in an FD-MIMO communication system according to an embodiment of the present disclosure has been described with reference to FIG. 6, and another example of CSI-RS antenna ports of a UPA antenna which uses a cross-polarization antenna as an element antenna used in an FD-MIMO communication system according to an embodiment of the present disclosure will be described with reference to FIG. 7.

Figure 7:
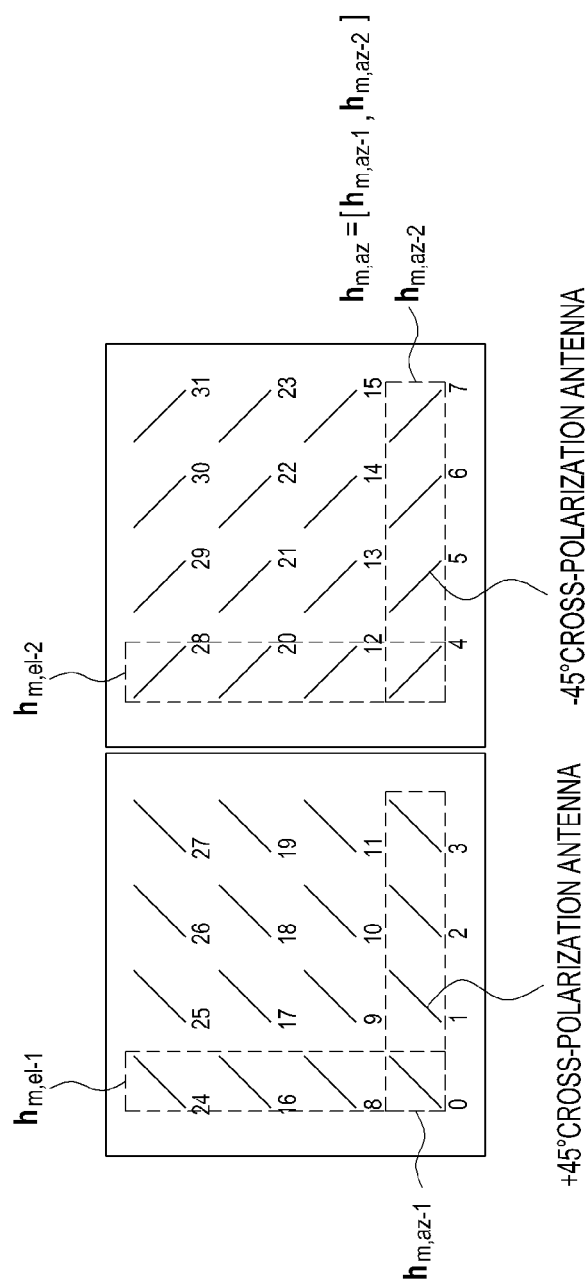
FIG. 7 schematically illustrates another example of CSI-RS antenna ports of a UPA antenna which uses a cross-polarization antenna as an element antenna used in an FD-MIMO communication system according to an embodiment of the present disclosure.

FIG. 7 schematically illustrates another example of CSI-RS antenna ports of a UPA antenna which uses a cross-polarization antenna as an element antenna used in an FD-MIMO communication system according to an embodiment of the present disclosure.

Referring to FIG. 7, a UPA antenna 711 uses a cross-polarization antenna as an element antenna, and the UPA antenna 711 includes total 32 cross-polarization antennas.

CSI-RS antenna ports shown in FIG. 7 indicate CSI-RS antenna ports in a horizontal axis and a vertical axis in a case of assuming that a signal transmitting apparatus uses a UPA antenna 711 including total 32 cross-polarization antennas, i.e., a cross-polarization antenna #0 to a cross-polarization antenna #31. The CSI-RS antenna ports shown in FIG. 7 indicate logical antenna ports. That is, the CSI-RS antenna ports shown in FIG. 7 indicate CSI-RS antenna ports which are arranged based on a polarization characteristic.

So, considering a CSI-RS transmission scheme as described in FIG. 2, 8 CSI-RS antenna ports in a horizontal axis include a cross-polarization antenna #0, a cross-polarization antenna #1, a cross-polarization antenna #2, a cross-polarization antenna #3, a cross-polarization antenna #4, a cross-polarization antenna #5, a cross-polarization antenna #6, and a cross-polarization antenna #7, and 4 CSI-RS antenna ports in a vertical axis include a cross-polarization antenna #0, a cross-polarization antenna #8, a cross-polarization #16, and a cross-polarization antenna #24.

As described above, in a case of cross-polarization antennas which have different polarization characteristics, channels for the cross-polarization antennas almost never have correlation, so accuracy of total channel information may be low.

So, an embodiment of the present disclosure additionally sets a cross-polarization antenna #4, a cross-polarization antenna #12, a cross-polarization antenna #20, and a cross-polarization antenna #28 as CSI-RS antenna ports in a vertical axis.

Here, all of additional cross-polarization antennas which are set as CSI-RS antenna ports are −45° cross-polarization antennas which have a −45° polarization characteristic. The reason why −45° cross-polarization antennas are additionally set as CSI-RS antenna ports is for increasing accuracy of total channel information to be estimated by considering a situation in which cross-polarization antennas set as CSI-RS antenna ports which are set as CSI-RS antenna ports in a vertical axis include +45° cross-polarization antennas and −45° cross-polarization antennas and a fact that antennas of which polarization characteristics are different have different channel characteristics.

As shown in FIG. 7, if CSI-RS antenna ports in a horizontal axis among total 32 cross-polarization antennas included in the UPA antenna 711 include a cross-polarization antenna #0, a cross-polarization antenna #1, a cross-polarization antenna #2, a cross-polarization antenna #3, a cross-polarization antenna #4, a cross-polarization antenna #5, a cross-polarization antenna #6, and a cross-polarization antenna #7, a channel vector $h_{m,az}$ may be estimated in a reception element antenna #m.

Next, if CSI-RS antenna ports in a vertical axis among the total 32 cross-polarization antennas included in the UPA antenna 711 includes a cross-polarization antenna #0, a cross-polarization antenna #8, a cross-polarization antenna #16, and a cross-polarization antenna #24, a channel vector $h_{m,el-1}$ may be estimated in the reception element antenna #m.

Lastly, if CSI-RS antenna ports in a vertical axis among the total 32 cross-polarization antennas included in the UPA antenna 711 includes a cross-polarization antenna #4, a cross-polarization antenna #12, a cross-polarization antenna #20, and a cross-polarization antenna #28, a channel vector $h_{m,el-2}$ may be estimated in the reception element antenna #m.

A channel $\hat{h}_m$ as a channel among the total 32 cross-polarization antennas, i.e., transmission antennas and the reception antenna #m may be estimated by performing a Kronecker-Product computation ($\otimes$) and a vectorization computation (vec(.)) on the estimated channel vector $h_{m,az}$, channel vector $h_{m,el-1}$, and channel vector $h_{m,el-2}$ as expressed in Equation (5).

$$h_{m,+45\,pol} = h_{m,el-1} \otimes h_{m,az-1},\ \hat{h}_{m,-45\,pol} = h_{m,el-2} \otimes h_{m,az-2} \hat{h}_m = vec([\hat{h}_{m,+45\,pol} \hat{h}_{m,-45\,pol}]) \quad \text{Equation (5)}$$

In Equation (5), the channel $\hat{h}_m$ is a row vector, and a size of the row vector $\hat{h}_m$ is equal to $N_T$ (=32) as the number of total transmission antennas.

Here, in a case of assuming that the number of reception antennas used in a signal receiving apparatus is $N_R$, a channel $\hat{H}$ as a $N_R \times N_T$ MIMO channel formed among the $N_T$(=32) transmission antennas and the $N_R$ reception antennas may be expressed as Equation (6).

$$\hat{H} = \begin{bmatrix} \hat{h}_0 \\ \hat{h}_1 \\ \vdots \\ \hat{h}_{N_R-1} \end{bmatrix} \quad \text{Equation (6)}$$

In Equation (6), $\hat{h}_{N_R-1}$ denotes a channel between the signal transmitting apparatus and an element antenna #$N_R$−1 among element antennas included in a UPA antenna used by the signal receiving apparatus.

In FIG. 7, for example, 4 CSI-RS antenna ports are additionally allocated in a vertical axis, however, this is just an example. So, the CSI-RS antenna ports may be additionally allocated in a horizontal axis, and there is no limitation on the number of additional CSI-RS antenna ports.

Another example of CSI-RS ports of a UPA antenna which uses a cross-polarization antenna as an element antenna used in an FD-MIMO communication system according to an embodiment of the present disclosure has been described with reference to FIG. 7, and a first stage-CSI processing process in an FD-MIMO communication system according to an embodiment of the present disclosure will be described with reference to FIG. 8.

Figure 8:
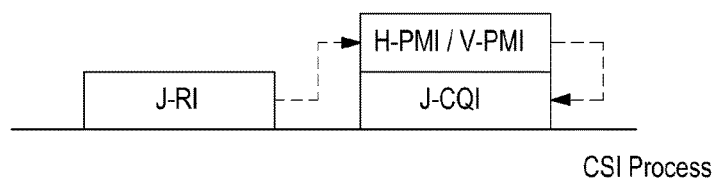
FIG. 8 schematically illustrates a first stage-CSI processing process in an FD-MIMO communication system according to an embodiment of the present disclosure.

FIG. 8 schematically illustrates a first stage-CSI processing process in an FD-MIMO communication system according to an embodiment of the present disclosure.

Prior to a description of FIG. 8, it will be noted that a first stage-CSI processing process described in FIG. 8 is a first stage-CSI processing process in which an antenna number indexing process as described in FIG. 6 is considered.

Referring to FIG. 8, a station transmits, to a serving base station, feedback information including a rank index (RI), a channel quality index (CQI), and a pre-coding matrix index (PMI).

Currently, in a 3GPP LTE standard, a CSI-RS transmission structure used per a CSI processing process may be identified based on CSI-RS configuration information, e.g., csi-RS-ConfigNZPId transmitted through upper layer signaling.

So, there is a need for defining CSI-RS configuration information which has a new form different from CSI-RS configuration information used in a current 3GPP LTE standard for indicating a new CSI-RS transmission structure proposed in an embodiment of the present disclosure, i.e., a CSI-RS transmission structure in which CSI-RS antenna ports are additionally set in a vertical axis.

So, an embodiment of the present disclosure defines new CSI-RS configuration information for indicating the CSI-RS transmission structure in which the CSI-RS antenna ports are additionally set in the vertical axis as the following.

```
CSI-RS-ConfigNZP-r13 ::= SEQUENCE {
  csi-RS-ConfigNZPId-r13          CSI-RS-ConfigNZPId-r13,
  *HantennaPortsCount-r13         ENUMERATED {an1, an2, an4,
                                   an8, an16, ...},
  VantennaPortsCount-r13          ENUMERATED {an1, an2, an4,
                                   an8, an16, ...},
  Dupulicated-HantennaPortsCount  ENUMERATED {ON, OFF},
  Dupulicated-VantennaPortsCount  ENUMERATED {ON, OFF},
  resourceConfig-r13              INTEGER (0..31),
  subframeConfig-r13              INTEGER (0..154),
  ...
  ... }
```

In the CSI-RS configuration information, HantennaPortsCount-r13 indicates the number of CSI-RS antenna ports allocated in a horizontal axis and VantennaPortsCount-r13 indicates the number of CSI-RS antenna ports allocated in a vertical axis. Here, the number of CSI-RS antenna ports allocated in the horizontal axis may be different from the number of real antennas included in the horizontal axis, and the of CSI-RS antenna ports allocated in the vertical axis may be different from the number of real antennas included in the vertical axis.

In the CSI-RS configuration information, Dupulicated-HantennaPortsCount indicates whether the number of CSI-RS antenna ports included in a horizontal axis of a CSI-RS transmission structure used in a current CSI processing process is equal to the number of CSI-RS antenna ports included in a horizontal axis which are allocated by considering an antenna number indexing process as described in FIG. 6, or the number of CSI-RS antenna ports included in a horizontal axis of a CSI-RS transmission structure used in a current CSI processing process is twice the number of CSI-RS antenna ports included in a horizontal axis which are allocated by considering an antenna number indexing process as described in FIG. 6.

Further, in the CSI-RS configuration information, Dupulicated-VantennaPortsCountindicates whether the number of CSI-RS antenna ports included in a vertical axis of a CSI-RS transmission structure used in a current CSI processing process is equal to the number of CSI-RS antenna ports included in a vertical axis which are allocated by considering an antenna number indexing process as described in FIG. 6, or the number of CSI-RS antenna ports included in a vertical axis of a CSI-RS transmission structure used in a current CSI processing process is twice the number of CSI-RS antenna ports included in a vertical axis which are allocated by considering an antenna number indexing process as described in FIG. 6.

So, CSI-RS configuration information may be set as the following for indicating a CSI-RS transmission structure which is based on CSI-RS antenna ports as described in FIG. 7.

```
*CSI-RS-ConfigNZP-r13 ::= SEQUENCE {
  ...
  HantennaPortsCount-r13          an8,
  VantennaPortsCount-r13          an8,
  Dupulicated-HantennaPortsCount  OFF,
  Dupulicated-VantennaPortsCount  ON,
  ... }
```

As expressed above, the number of CSI-RS antenna ports is increased twice only in a vertical axis in FIG. 7, so Dupulicated-HantennaPortsCount is set to OFF, and Dupulicated-VantennaPortsCount is set to ON.

Meanwhile, in an embodiment of the present disclosure, whether the number of CSI-RS antenna ports is increased twice compared to the number of previous CSI-RS antenna ports is determined since CSI-RS antenna ports are added as described in FIG. 7. However, in a case that CSI-RS antenna ports are added with a form different a form as described in FIG. 7, the number of added CSI-RS antenna ports may be N times the number of previous CSI-RS antenna ports.

A first stage-CSI processing process in an FD-MIMO communication system according to an embodiment of the present disclosure has been described with reference to FIG. 8, and a second stage-CSI processing process in an FD-MIMO communication system according to an embodiment of the present disclosure will be described with reference to FIG. 9.

Figure 9:
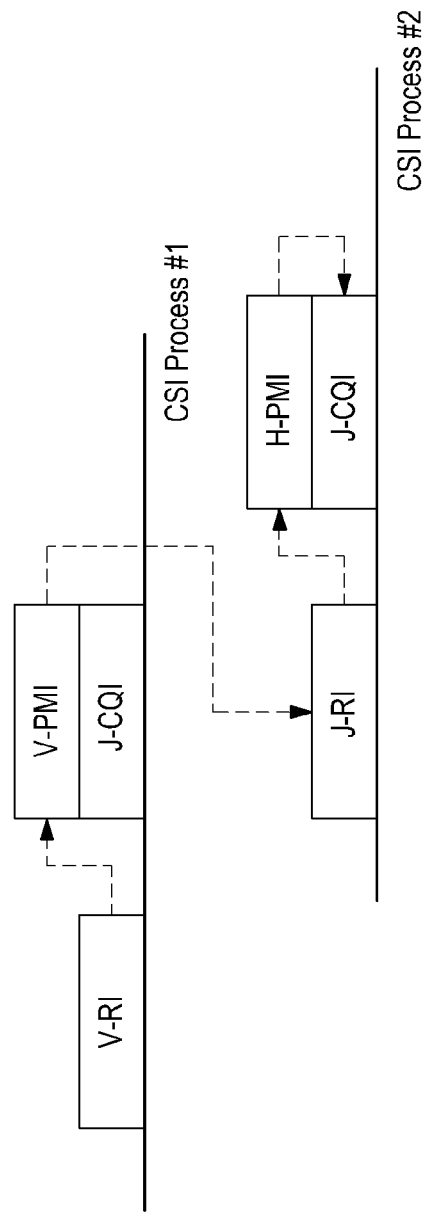
FIG. 9 schematically illustrates a second stage-CSI processing process in an FD-MIMO communication system according to an embodiment of the present disclosure.

FIG. 9 schematically illustrates a second stage-CSI processing process in an FD-MIMO communication system according to an embodiment of the present disclosure.

Prior to a description of FIG. 9, it will be noted that a second stage-CSI processing process described in FIG. 9 is a second stage-CSI processing process in which an antenna number indexing process as described in FIG. 6 is considered.

Specially, a second stage-CSI processing process as shown in FIG. 9 indicates a second stage-CSI processing process in which a CSI processing process for CSI-RS antenna ports in a horizontal axis is performed after a CSI processing process for CSI-RS antenna ports in a vertical axis is performed. Here, the CSI processing process for the CSI-RS antenna ports in the vertical axis and the CSI processing process for the CSI-RS antenna ports in the horizontal axis may be performed at different times, and the CSI processing process for the CSI-RS antenna ports in the vertical axis and the CSI processing process for the CSI-RS antenna ports in the horizontal axis may be performed by different periods.

So, as shown in FIG. 9, a joint CQI is calculated based on an RI and a PMI transmitted in a previously performed CSI processing process and the joint CQI is transmitted. Here, the previously performed CSI processing process is a CSI processing process for CSI-RS antenna ports in a vertical axis.

Currently, in a 3GPP LTE standard, a CSI-RS transmission structure used per a CSI processing process may be identified based on CSI-RS configuration information, e.g., csi-RS-ConfigNZPId transmitted through upper layer signaling.

So, there is a need for defining CSI-RS configuration information which has a new form different from CSI-RS configuration information used in a current 3GPP LTE standard for indicating a new CSI-RS transmission structure proposed in an embodiment of the present disclosure, i.e., a CSI-RS transmission structure which is based on a second stage-CSI processing process as shown in FIG. 9.

So, an embodiment of the present disclosure will define new CSI-RS configuration information for indicating the new CSI-RS transmission structure as the following. an32, ... },

```
CSI-RS-ConfigNZP-r13 ::= SEQUENCE {
  csi-RS-ConfigNZPId-r13          CSI-RS-ConfigNZPId-r13,
```

```
*antennaPortsCount-r13      ENUMERATED {an1, an2, an4,
                              an8, an16, an32,...},
HV-antennaPortConfig       ENUMERATED {Horizontal,
                              Vertical},
Dupulicated-antennaPortsCount  ENUMERATED {ON, OFF},
resourceConfig-r13         INTEGER (0..31),
subframeConfig-r13         INTEGER (0..154),
...
... }
```

In the CSI-RS configuration information, antennaPortsCount-r13 indicates the number of CSI-RS antenna ports used in a corresponding CSI processing process. Here, indicated CSI-RS antenna ports indicate CSI-RS antenna ports allocated in a horizontal axis and CSI-RS antenna ports allocated in a vertical axis according to CSI-RS antenna ports considered in a corresponding CSI processing process. Here, the number of CSI-RS antenna ports allocated in the horizontal axis may be different from the number of real antennas included in the horizontal axis, and the of CSI-RS antenna ports allocated in the vertical axis may be different from the number of real antennas included in the vertical axis.

In the CSI-RS configuration information, Dupulicated-antennaPortsCount indicates whether the number of CSI-RS antenna ports included in a horizontal or vertical axis of a CSI-RS transmission structure used in a current CSI processing process is equal to the number of CSI-RS antenna ports included in a horizontal or vertical axis which are allocated by considering an antenna number indexing process as described in FIG. 6, or the number of CSI-RS antenna ports included in a horizontal or vertical axis of a CSI-RS transmission structure used in a current CSI processing process is twice the number of CSI-RS antenna ports included in a horizontal or vertical axis which are allocated by considering an antenna number indexing process as described in FIG. 6.

So, CSI-RS configuration information may be set as the following for indicating a CSI-RS transmission structure which is based on CSI-RS antenna ports as described in FIG. 7.

[First Stage-CSI Processing Process]

```
CSI-RS-ConfigNZP-r13 ::== {  ...
    antennaPortsCount-r13          an8
    HV-antennaPortConfig           Vertical
    Dupulicated-antennaPortsCount  ON
    ... }
```

[Second Stage-CSI Processing Process]

```
CSI-RS-ConfigNZP-r13 ::== {  ...
    antennaPortsCount-r13          an8
    HV-antennaPortConfig           Horizontal
    Dupulicated-antennaPortsCount  OFF
    ... }
```

Meanwhile, in an embodiment of the present disclosure, whether the number of CSI-RS antenna ports is increased twice compared to the number of previous CSI-RS antenna ports is determined since CSI-RS antenna ports are added as described in FIG. 7. However, in a case that CSI-RS antenna ports are added with a form different a form as described in FIG. 7, the number of added CSI-RS antenna ports may be N times the number of previous CSI-RS antenna ports.

An example of a second stage-CSI processing process in an FD-MIMO communication system according to an embodiment of the present disclosure has been described with reference to FIG. 9, and another example of a second stage-CSI processing process in an FD-MIMO communication system according to an embodiment of the present disclosure will be described with reference to FIG. 10.

Figure 10:
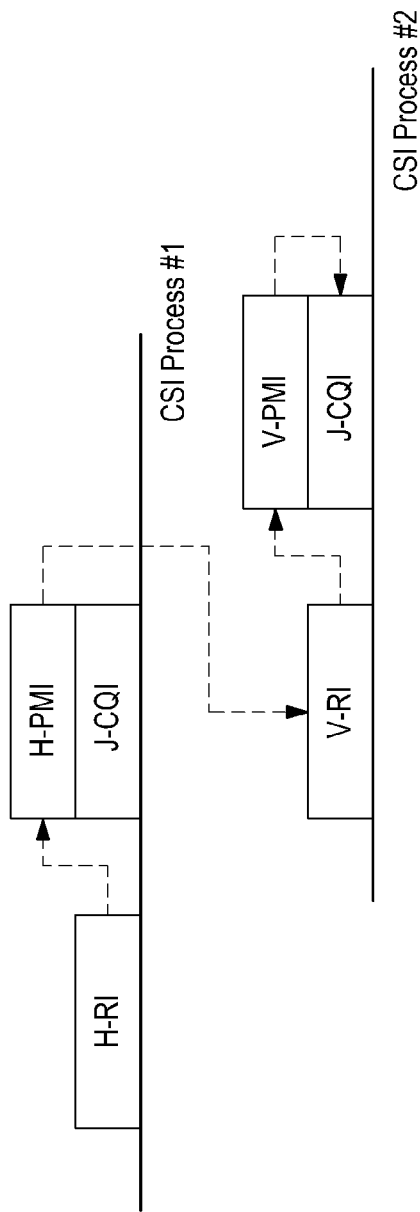
FIG. 10 schematically illustrates another example of a second stage-CSI processing process in an FD-MIMO communication system according to an embodiment of the present disclosure.

FIG. 10 schematically illustrates another example of a second stage-CSI processing process in an FD-MIMO communication system according to an embodiment of the present disclosure.

Prior to a description of FIG. 10, it will be noted that a second stage-CSI processing process as described in FIG. 10 is a second stage-CSI processing process in which an antenna number indexing process as described in FIG. 6 is considered.

Specially, a second stage-CSI processing process as shown in FIG. 10 indicates a second stage-CSI processing process in which a CSI processing process for CSI-RS antenna ports in a vertical axis is performed after a CSI processing process for CSI-RS antenna ports in a horizontal axis is performed. Here, the CSI processing process for the CSI-RS antenna ports in the horizontal axis and the CSI processing process for the CSI-RS antenna ports in the vertical axis may be performed at different times, and the CSI processing process for the CSI-RS antenna ports in the horizontal axis and the CSI processing process for the CSI-RS antenna ports in the vertical axis may be performed by different periods.

So, as shown in FIG. 10, a joint CQI is calculated based on an RI and a PMI transmitted in a previously performed CSI processing process and the joint CQI is transmitted. Here, the previously performed CSI processing process is a CSI processing process for CSI-RS antenna ports in a horizontal axis.

Currently, in a 3GPP LTE standard, a CSI-RS transmission structure used per a CSI processing process may be identified based on CSI-RS configuration information, e.g., csi-RS-ConfigNZPId transmitted through upper layer signaling.

So, there is a need for defining CSI-RS configuration information which has a new form different from CSI-RS configuration information used in a current 3GPP LTE standard for indicating a new CSI-RS transmission structure proposed in an embodiment of the present disclosure, i.e., a CSI-RS transmission structure which is based on a second stage-CSI processing process as shown in FIG. 10.

So, an embodiment of the present disclosure will define new CSI-RS configuration information for indicating the new CSI-RS transmission structure as the following.
an32, . . . },

```
CSI-RS-ConfigNZP-r13 ::= SEQUENCE {
    csi-RS-ConfigNZPId-r13        CSI-RS-ConfigNZPId-r13,
    *antennaPortsCount-r13        ENUMERATED {an1, an2, an4,
                                    an8, an16, an32,...},
    HV-antennaPortConfig          ENUMERATED {Horizontal,
                                    Vertical},
    Dupulicated-antennaPortsCount  ENUMERATED {ON, OFF},
    resourceConfig-r13            INTEGER (0..31),
    subframeConfig-r13            INTEGER (0..154),
    ...
    ... }
```

In the CSI-RS configuration information, antennaPortsCount-r13 indicates the number of CSI-RS antenna ports used in a corresponding CSI processing process. Here, indicated CSI-RS antenna ports indicate CSI-RS antenna ports allocated in a horizontal axis and CSI-RS antenna ports allocated in a vertical axis according to CSI-RS antenna ports considered in a corresponding CSI processing process. Here, the number of CSI-RS antenna ports allocated in the horizontal axis may be different from the number of real antennas included in the horizontal axis, and the of CSI-RS antenna ports allocated in the vertical axis may be different from the number of real antennas included in the vertical axis.

In the CSI-RS configuration information, DupulicatedantennaPortsCount indicates whether the number of CSI-RS antenna ports included in a horizontal or vertical axis of a CSI-RS transmission structure used in a current CSI processing process is equal to the number of CSI-RS antenna ports included in a horizontal or vertical axis which are allocated by considering an antenna number indexing process as described in FIG. 6, or the number of CSI-RS antenna ports included in a horizontal or vertical axis of a CSI-RS transmission structure used in a current CSI processing process is twice the number of CSI-RS antenna ports included in a horizontal or vertical axis which are allocated by considering an antenna number indexing process as described in FIG. 6.

So, CSI-RS configuration information may be set as the following for indicating a CSI-RS transmission structure which is based on CSI-RS antenna ports as described in FIG. 7.

[First Stage-CSI Processing Process]

```
CSI-RS-ConfigNZP-r13 ::== {  ...
    antennaPortsCount-r13          an8
    HV-antennaPortConfig           Horizontal
    Dupulicated-antennaPortsCount  ON
    ... }
```

[Second Stage-CSI Processing Process]

```
CSI-RS-ConfigNZP-r13 ::== {  ...
    antennaPortsCount-r13          an8
    HV-antennaPortConfig           Vertical
    Dupulicated-antennaPortsCount  OFF
    ... }
```

Meanwhile, in an embodiment of the present disclosure, whether the number of CSI-RS antenna ports is increased twice compared to the number of previous CSI-RS antenna ports is determined since CSI-RS antenna ports are added as described in FIG. 7. However, in a case that CSI-RS antenna ports are added with a form different a form as described in FIG. 7, the number of added CSI-RS antenna ports may be N times the number of previous CSI-RS antenna ports.

Another example of a second stage-CSI processing process in an FD-MIMO communication system according to an embodiment of the present disclosure has been described with reference to FIG. 10, and still another example of a second stage-CSI processing process in an FD-MIMO communication system according to an embodiment of the present disclosure will be described with reference to FIG. 11.

Figure 11:
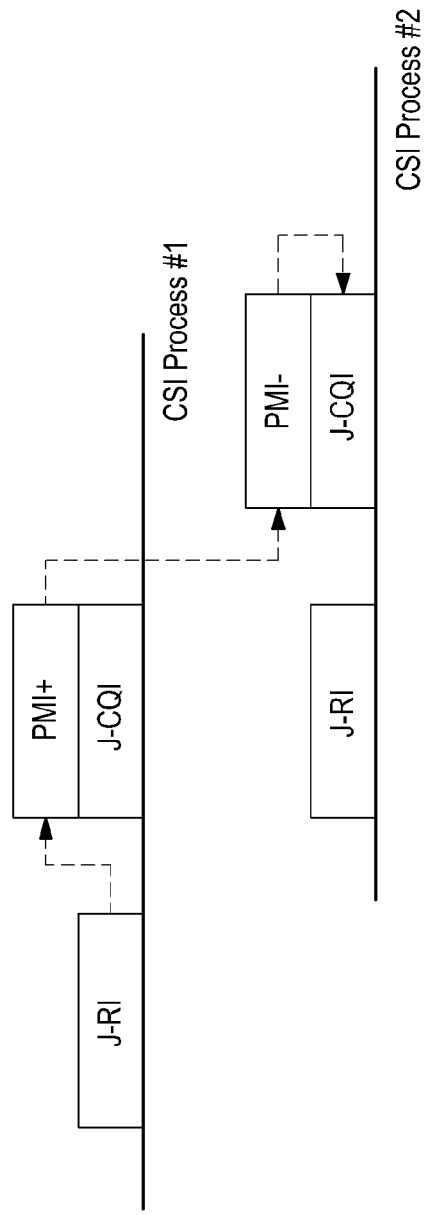
FIG. 11 schematically illustrates still another example of a second stage-CSI processing process in an FD-MIMO communication system according to an embodiment of the present disclosure.

FIG. 11 schematically illustrates still another example of a second stage-CSI processing process in an FD-MIMO communication system according to an embodiment of the present disclosure.

Prior to a description of FIG. 11, it will be noted that a second stage-CSI processing process as described in FIG. 11 is a second stage-CSI processing process in which an antenna number indexing process as described in FIG. 6 is considered.

Specially, a second stage-CSI processing process as shown in FIG. 11 indicates a second stage-CSI processing process in which a CSI processing process for CSI-RS antenna ports including −45° cross-polarization antennas is performed after a CSI processing process for CSI-RS antenna ports including +45° cross-polarization antennas is performed. Here, the CSI processing process for the CSI-RS antenna ports including the +45° cross-polarization antennas and the CSI processing process for the CSI-RS antenna ports including −45° cross-polarization antennas may be performed at different times, and the CSI processing process for the CSI-RS antenna ports including the +45° cross-polarization antennas and the CSI processing process for the CSI-RS antenna ports including −45° cross-polarization antennas may be performed by different periods.

So, as shown in FIG. 11, a joint CQI is calculated based on an RI and a PMI transmitted in a previously performed CSI processing process and the joint CQI is transmitted. Here, the previously performed CSI processing process is a CSI processing process for CSI-RS antenna ports including +45° cross-polarization antennas.

Currently, in a 3GPP LTE standard, a CSI-RS transmission structure used per a CSI processing process may be identified based on CSI-RS configuration information, e.g., csi-RS-ConfigNZPId transmitted through upper layer signaling.

So, there is a need for defining CSI-RS configuration information which has a new form different from CSI-RS configuration information used in a current 3GPP LTE standard for indicating a new CSI-RS transmission structure proposed in an embodiment of the present disclosure, i.e., a CSI-RS transmission structure which is based on a second stage-CSI processing process as shown in FIG. 11.

So, an embodiment of the present disclosure will define new CSI-RS configuration information for indicating the new CSI-RS transmission structure as the following.

```
CSI-RS-ConfigNZP-r13 ::= SEQUENCE {
    csi-RS-ConfigNZPId-r13      CSI-RS-ConfigNZPId-r13,
    *HantennaPortsCount-r13     ENUMERATED {an1, an2, an4,
                                    an8, an16, ...},
    VantennaPortsCount-r13      ENUMERATED {an1, an2, an4, an8,
                                    an16, ...},
    resourceConfig-r13          INTEGER (0..31),
    subframeConfig-r13          INTEGER (0..154),
    - ... -
    ... }
```

In the CSI-RS configuration information, HantennaPortsCount-r13 indicates the number of CSI-RS antenna ports allocated in a horizontal axis and VantennaPortsCount-r13 indicates the number of CSI-RS antenna ports allocated in a vertical axis. Here, the number of CSI-RS antenna ports allocated in the horizontal axis may be different from the number of real antennas included in the horizontal axis, and the of CSI-RS antenna ports allocated in the vertical axis may be different from the number of real antennas included in the vertical axis. Further, in a second stage-CSI processing process as shown in FIG. 11, a signal receiving apparatus, i.e., a station does not need to know that a CSI-RS transmitted in a corresponding CSI processing process is transmitted on which one of a +45° cross-polarization antenna and a −45° cross-polarization antenna. Further, the same CSI-RS configuration information is used per CSI processing process without being separated per CSI processing process.

So, for indicating a CSI-RS transmission structure which is based on CSI-RS antenna ports as described in FIG. 7, the same CSI-RS configuration information may be set as the following for CSI processing processes.

```
CSI-RS-ConfigNZP-r13 ::= SEQUENCE {...
    HantennaPortsCount-r13      an4,
    VantennaPortsCount-r13      an4,
    ... }
```

Still another example of a second stage-CSI processing process in an FD-MIMO communication system according to an embodiment of the present disclosure has been described with reference to FIG. 11, and still another example of a second stage-CSI processing process in an FD-MIMO communication system according to an embodiment of the present disclosure will be described with reference to FIG. 12.

Figure 12:
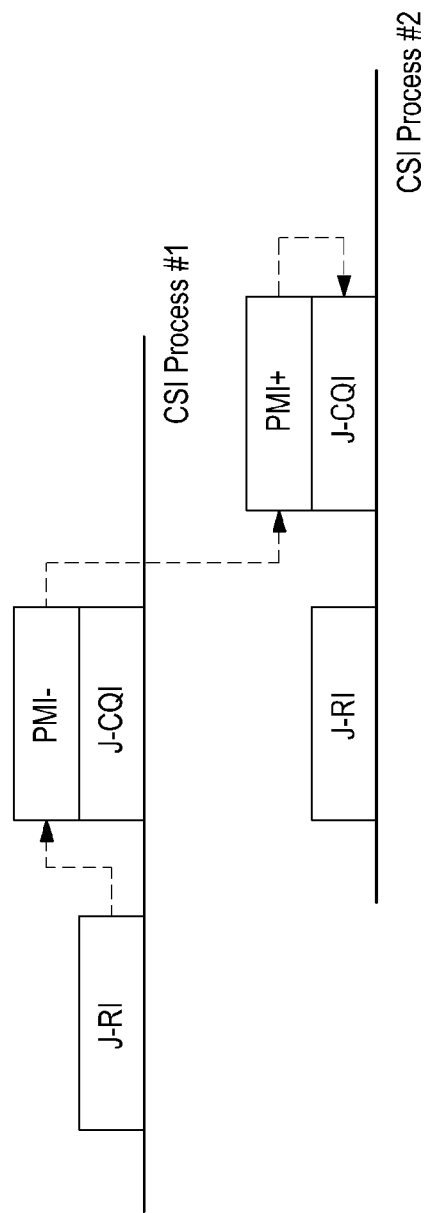
FIG. 12 schematically illustrates still another example of a second stage-CSI processing process in an FD-MIMO communication system according to an embodiment of the present disclosure.

FIG. 12 schematically illustrates still another example of a second stage-CSI processing process in an FD-MIMO communication system according to an embodiment of the present disclosure.

Prior to a description of FIG. 12, it will be noted that a second stage-CSI processing process as described in FIG. 12 is a second stage-CSI processing process in which an antenna number indexing process as described in FIG. 6 is considered.

Specially, a second stage-CSI processing process as shown in FIG. 12 indicates a second stage-CSI processing process in which a CSI processing process for CSI-RS antenna ports including +45° cross-polarization antennas is performed after a CSI processing process for CSI-RS antenna ports including −45° cross-polarization antennas is performed. Here, the CSI processing process for the CSI-RS antenna ports including the −45° cross-polarization antennas and the CSI processing process for the CSI-RS antenna ports including +45° cross-polarization antennas may be performed at different times, and the CSI processing process for the CSI-RS antenna ports including the −45° cross-polarization antennas and the CSI processing process for the CSI-RS antenna ports including +45° cross-polarization antennas may be performed by different periods.

So, as shown in FIG. 12, a joint CQI is calculated based on rank information and PMI information transmitted in a previously performed CSI processing process and the joint CQI is transmitted. Here, the previously performed CSI processing process is a CSI processing process for CSI-RS antenna ports including −45° cross-polarization antennas.

Currently, in a 3GPP LTE standard, a CSI-RS transmission structure used per a CSI processing process may be identified based on CSI-RS configuration information, e.g., csi-RS-ConfigNZPId transmitted through upper layer signaling.

So, there is a need for defining CSI-RS configuration information which has a new form different from CSI-RS configuration information used in a current 3GPP LTE standard for indicating a new CSI-RS transmission structure proposed in an embodiment of the present disclosure, i.e., a CSI-RS transmission structure which is based on a second stage-CSI processing process as shown in FIG. 12.

So, an embodiment of the present disclosure will define new CSI-RS configuration information for indicating the new CSI-RS transmission structure as the following.

```
CSI-RS-ConfigNZP-r13 ::= SEQUENCE {
    csi-RS-ConfigNZPId-r13      CSI-RS-ConfigNZPId-r13,
    *HantennaPortsCount-r13     ENUMERATED {an1, an2, an4,
                                            an8, an16, ...},
    VantennaPortsCount-r13      ENUMERATED {an1, an2, an4, an8,
                                            an16, ...},
    resourceConfig-r13          INTEGER (0..31),
    subframeConfig-r13          INTEGER (0..154),
    - ... -
    ... }
```

In the CSI-RS configuration information, HantennaPortsCount-r13 indicates the number of CSI-RS antenna ports allocated in a horizontal axis and VantennaPortsCount-r13 indicates the number of CSI-RS antenna ports allocated in a vertical axis. Here, the number of CSI-RS antenna ports allocated in the horizontal axis may be different from the number of real antennas included in the horizontal axis, and the of CSI-RS antenna ports allocated in the vertical axis may be different from the number of real antennas included in the vertical axis. Further, in a second stage-CSI processing process as shown in FIG. 12, a signal receiving apparatus, i.e., a station does not need to know that a CSI-RS transmitted in a corresponding CSI processing process is transmitted on which one of a +45° cross-polarization antenna and a −45° cross-polarization antenna. Further, the same CSI-RS configuration information is used per CSI processing process without being separated per CSI processing process.

So, for indicating a CSI-RS transmission structure which is based on CSI-RS antenna ports as described in FIG. 7, CSI-RS configuration information may be set the same for CSI processing processes as follows.

In order to indicate the CSI-RS transmission structure, the CSI-RS configuration information may be set the same for CSI processing procedures as follows. The following CSI-RS configuration information is the same as FIG. 11.

```
CSI-RS-ConfigNZP-r13 ::= SEQUENCE {...
    HantennaPortsCount-r13      an4,
    VantennaPortsCount-r13      an4,
    ... }
```

Still another example of a second stage-CSI processing process in an FD-MIMO communication system according to an embodiment of the present disclosure has been described with reference to FIG. 12, and multi user-multiple input multiple output (MU-MIMO) sum-capacity in an FD-MIMO communication system according to an embodiment of the present disclosure will be described with reference to FIG. 13.

Figure 13:
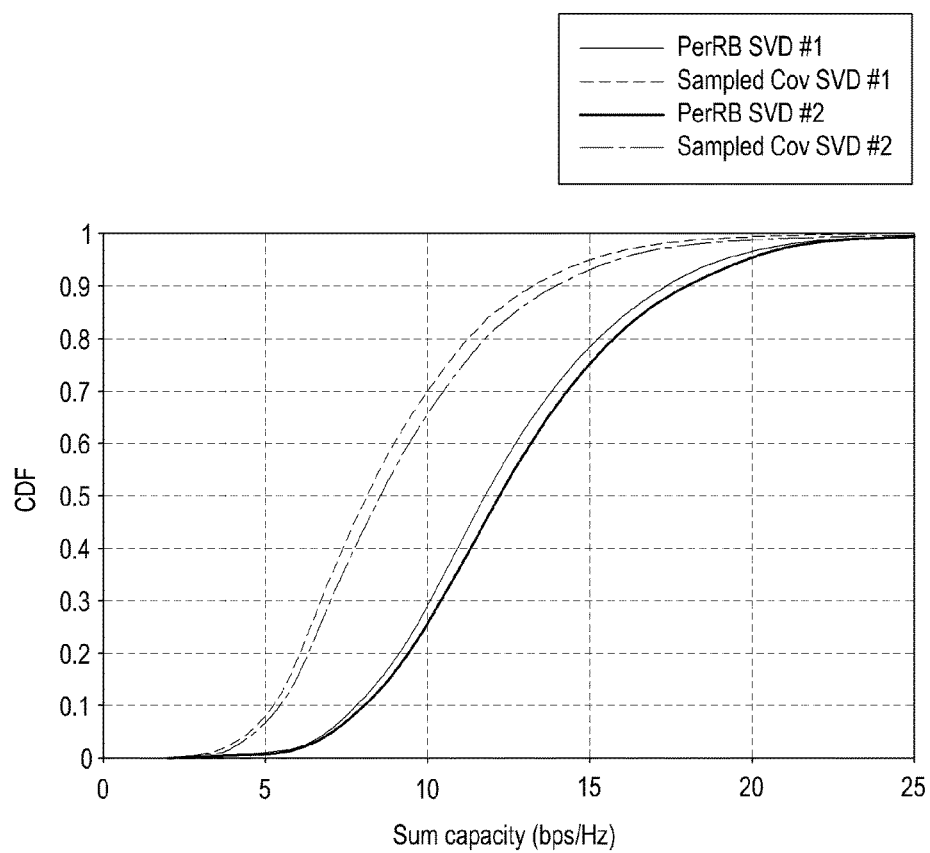
FIG. 13 schematically illustrates a MU-MIMO sum-capacity performance in an FD-MIMO communication system according to an embodiment of the present disclosure.

FIG. 13 schematically illustrates a MU-MIMO sum-capacity performance in an FD-MIMO communication system according to an embodiment of the present disclosure.

Referring to FIG. 13, a shown MU-MIMO sum-capacity performance graph indicates a MU-MIMO sum-capacity performance graph in a case that a signal transmitting apparatus uses a UPA antenna in which the number of element antennas is 32, i.e., a UPA antenna including 8 element antennas in a horizontal axis and 4 element antennas in a vertical axis, and supports MU-MIMO transmission for 8 stations at the same time.

In FIG. 13, MU-MIMO sum-capacity performance graphs shown as 'PerRB SVD#1' and 'Sample Cov SVD#1' indicate MU-MIMO sum-capacity performance graphs in a case of transmitting CSI-RS signals using CSI-RS antenna ports as described in FIG. 3.

In FIG. 13, MU-MIMO sum-capacity performance graphs shown as 'PerRB SVD#2" and 'Sample Cov SVD#2' indicate MU-MIMO sum-capacity performance graphs in a case of transmitting CSI-RS signals using CSI-RS antenna ports as described in FIG. 7.

A MU-MIMO sum-capacity performance in an FD-MIMO communication system according to an embodiment of the present disclosure has been described with reference to FIG. 13, and an inner structure of a signal transmitting apparatus in an FD-MIMO communication system according to an embodiment of the present disclosure will be described with reference to FIG. 14.

Figure 14:
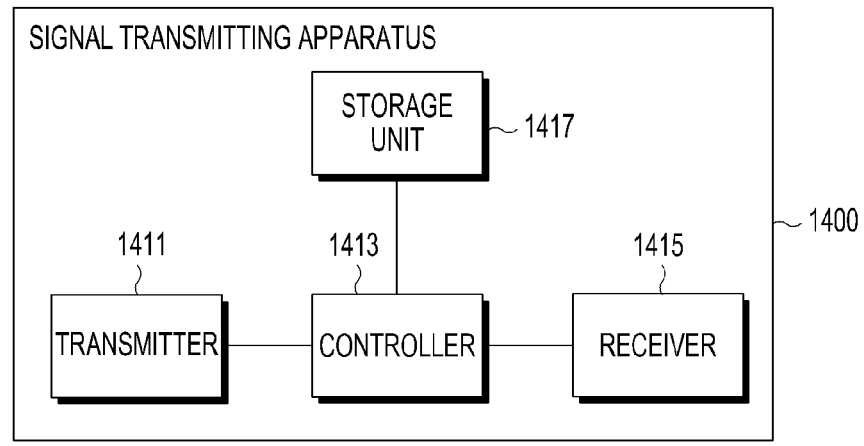
FIG. 14 schematically illustrates an inner structure of a signal transmitting apparatus in an FD-MIMO communication system according to an embodiment of the present disclosure.

FIG. 14 schematically illustrates an inner structure of a signal transmitting apparatus in an FD-MIMO communication system according to an embodiment of the present disclosure.

Referring to FIG. 14, a signal transmitting apparatus 1400 includes a transmitter 1411, a controller 1413, a receiver 1415, and a storage unit 1417.

The controller 1413 controls the overall operation of the signal transmitting apparatus 1400. The controller 1413 controls the signal transmitting apparatus 1400 to perform a CSI-RS transmitting operation according to an embodiment of the present disclosure, i.e., the overall operation related to a CSI-RS transmitting operation which considers a cross-polarization antenna characteristic. Here, a CSI-RS transmitting operation which considers a cross-polarization antenna characteristic according to an embodiment of the present disclosure has been described with FIGS. 1 to 13, and a detailed description thereof will be omitted herein.

The transmitter 1411 transmits various signals, various messages, and/or the like to a signal receiving apparatus and/or the like under a control of the controller 1413. The various signals, the various messages, and/or the like transmitted in the transmitter 1411 have been described with reference to FIGS. 1 to 13, and a detailed description thereof will be omitted herein.

The receiver 1415 receives various signals, various messages, and/or the like from the signal receiving apparatus and/or the like under a control of the controller 1413. The various signals, the various messages, and/or the like received in the receiver 1415 have been described with reference to FIGS. 1 to 13, and a detailed description thereof will be omitted herein.

The storage unit 1417 stores a program, various data, and/or the like necessary for an operation of the signal transmitting apparatus 1400, and more particular, information related to a CSI-RS transmitting operation which considers a cross-polarization antenna characteristic according to an embodiment of the present disclosure and/or the like. The storage unit 1417 stores various signals and various messages which are received by the receiver 1415 from the signal receiving apparatus and/or the like.

While the transmitter 1411, the controller 1413, the receiver 1415, and the storage unit 1417 are described in the signal transmitting apparatus 1400 as separate units, however, the signal transmitting apparatus 1400 may be implemented as a form that at least two of the transmitter 1411, the controller 1413, the receiver 1415, and the storage unit 1417 may be incorporated into a single unit. Further, the signal transmitting apparatus 1400 may be implemented with one processor.

An inner structure of a signal transmitting apparatus in an FD-MIMO communication system according to an embodiment of the present disclosure has been described with reference to FIG. 14, and an inner structure of a signal receiving apparatus in an FD-MIMO communication system according to an embodiment of the present disclosure will be described with reference to FIG. 15.

Figure 15:
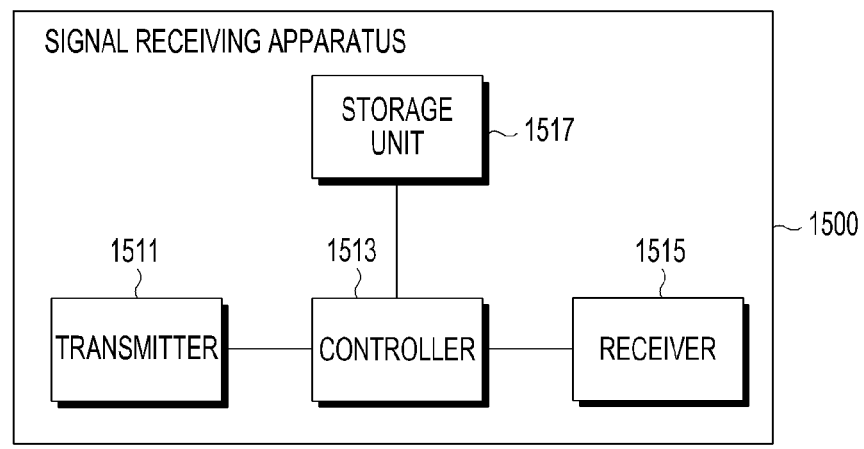
FIG. 15 schematically illustrates an inner structure of a signal receiving apparatus in an FD-MIMO communication system according to an embodiment of the present disclosure.

FIG. 15 schematically illustrates an inner structure of a signal receiving apparatus in an FD-MIMO communication system according to an embodiment of the present disclosure.

Referring to FIG. 15, a signal receiving apparatus 1500 includes a transmitter 1511, a controller 1513, a receiver 1515, and a storage unit 1517.

The controller 1513 controls the overall operation of the signal receiving apparatus 1500. The controller 1513 controls the signal receiving apparatus 1500 to perform a CSI-RS receiving operation according to an embodiment of the present disclosure, i.e., the overall operation related to a CSI-RS receiving operation which considers a cross-polarization antenna characteristic. Here, a CSI-RS receiving operation which considers a cross-polarization antenna characteristic according to an embodiment of the present disclosure has been described with FIGS. 1 to 13, and a detailed description thereof will be omitted herein.

The transmitter 1511 transmits various signals, various messages, and/or the like to a signal transmitting apparatus and/or the like under a control of the controller 1513. The various signals, the various messages, and/or the like transmitted in the transmitter 1511 have been described with reference to FIGS. 1 to 13, and a detailed description thereof will be omitted herein.

The receiver 1515 receives various signals, various messages, and/or the like from the signal transmitting apparatus and/or the like under a control of the controller 1513. The various signals, the various messages, and/or the like received in the receiver 1515 have been described with reference to FIGS. 1 to 13, and a detailed description thereof will be omitted herein.

The storage unit 1517 stores a program, various data, and/or the like necessary for an operation of the signal receiving apparatus 1500, and more particular, information related to a CSI-RS receiving operation which considers a cross-polarization antenna characteristic according to an embodiment of the present disclosure and/or the like. The storage unit 1517 stores various signals and various messages which are received by the receiver 1515 from the signal transmitting apparatus and/or the like.

While the transmitter 1511, the controller 1513, the receiver 1515, and the storage unit 1517 are described in the signal receiving apparatus 1500 as separate units, however, the signal receiving apparatus 1500 may be implemented as a form that at least two of the transmitter 1511, the controller 1513, the receiver 1515, and the storage unit 1517 may be incorporated into a single unit. Further, the signal receiving apparatus 1500 may be implemented with one processor.

An embodiment of the present disclosure enables to transmit/receive a reference signal in a communication system supporting an FD-MIMO scheme.

An embodiment of the present disclosure enables to transmit/receive a reference signal in a communication system supporting an FD-MIMO scheme thereby exactly estimating channel information.

An embodiment of the present disclosure enables to transmit/receive a reference signal in a communication system supporting an FD-MIMO scheme thereby decreasing the number of resources used for reference signal transmission.

An embodiment of the present disclosure enables to transmit/receive a reference signal by considering a UPA antenna characteristic in a communication system supporting an FD-MIMO scheme.

An embodiment of the present disclosure enables to transmit/receive a reference signal by considering a cross-polarization antenna characteristic in a communication system supporting an FD-MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a reference signal in a transmitting apparatus in a communication system, the method comprising:

transmitting reference signals to a receiving apparatus through m antenna ports included in a vertical axis of a two-dimensional space of a uniform planar array (UPA) antenna; and transmitting the reference signals to the receiving apparatus through n antenna ports included in a horizontal axis of the two-dimensional space of the UPA antenna, wherein each of the m antenna ports in the vertical axis has a first polarization characteristic, and wherein each of the n antenna ports in the horizontal axis has a second polarization characteristic which is cross polarized to the first polarization characteristic.

2. The method of claim 1, wherein the first polarization characteristic is one of a +45° polarization characteristic or a −45° polarization characteristic, or wherein the second polarization characteristic is one of a +45° polarization characteristic or a −45° polarization characteristic.

3. The method of claim 1, further comprising:

transmitting information related to the m antenna ports or the n antenna ports.

4. A method for receiving a reference signal in a receiving apparatus in a communication system, the method comprising:

receiving reference signals from a transmitting apparatus, wherein the reference signals include reference signals which are transmitted in the transmitting apparatus through m antenna ports included in a vertical axis of a two-dimensional space of a uniform planar array (UPA) antenna and reference signals which are transmitted in the transmitting apparatus through n antenna ports included in a horizontal axis of the two-dimensional space of the UPA antenna, wherein each of the m antenna ports in the vertical axis has a first polarization characteristic, and wherein each of the n antenna ports in the horizontal axis has a second polarization characteristic which is cross polarized to the first polarization characteristic.

5. The method of claim 4, wherein the first polarization characteristic is one of a +45° polarization characteristic or a −45° polarization characteristic, or wherein the second polarization characteristic is one of a +45° polarization characteristic or a −45° polarization characteristic.

6. The method of claim 4, further comprising:

receiving information related to the m antenna ports or the n antenna ports.

7. A transmitting apparatus in a communication system, the transmitting apparatus comprising:

a transmitter configured to transmit reference signals to a receiving apparatus through m antenna ports included in a vertical axis of a two-dimensional space of a uniform planar array (UPA) antenna, and to transmit the reference signals to the receiving apparatus through n antenna ports included in a horizontal axis of the two-dimensional space of the UPA antenna, wherein each of the m antenna ports in the vertical axis has a first polarization characteristic, and wherein each of the n antenna ports in the horizontal axis has a second polarization characteristic which is cross polarized to the first polarization characteristic.

8. The transmitting apparatus of claim 7, wherein the first polarization characteristic is one of a +45° polarization characteristic or a −45° polarization characteristic, or wherein the second polarization characteristic is one of a +45° polarization characteristic or a −45° polarization characteristic.

9. The transmitting apparatus of claim 7, wherein the transmitter is configured to transmit information related to the m antenna ports or the n antenna ports.

10. A receiving apparatus in a communication system, the receiving apparatus comprising:

a receiver configured to receive reference signals from a transmitting apparatus, wherein the reference signals include reference signals which are transmitted in the transmitting apparatus through m antenna ports included in a vertical axis of a two-dimensional space of a uniform planar array (UPA) antenna and reference signals which are transmitted in the transmitting apparatus through n antenna ports included in a horizontal axis of the two-dimensional space of the UPA antenna, wherein each of the m antenna ports in the vertical axis has a first polarization characteristic, wherein each of the n antenna ports in the horizontal axis has a second polarization characteristic which is cross polarized to the first polarization characteristic.

11. The receiving apparatus of claim 10, wherein the first polarization characteristic is one of a +45° polarization characteristic or a −45° polarization characteristic, or wherein the second polarization characteristic is one of a +45° polarization characteristic or a −45° polarization characteristic.

12. The receiving apparatus of claim 10, wherein the receiver is configured to receive information to the m antenna ports or the n antenna ports.

13. The method of claim 1, wherein the reference signals include channel state information-reference signals (CSI-RSs).

14. The method of claim 4, wherein the reference signals include channel state information-reference signals (CSI-RSs).

15. The transmitting apparatus of claim 7, wherein the reference signals include channel state information-reference signals (CSI-RSs).

16. The receiving apparatus of claim 10, wherein the reference signals include channel state information-reference signals (CSI-RSs).

* * * * *